Figure 11:
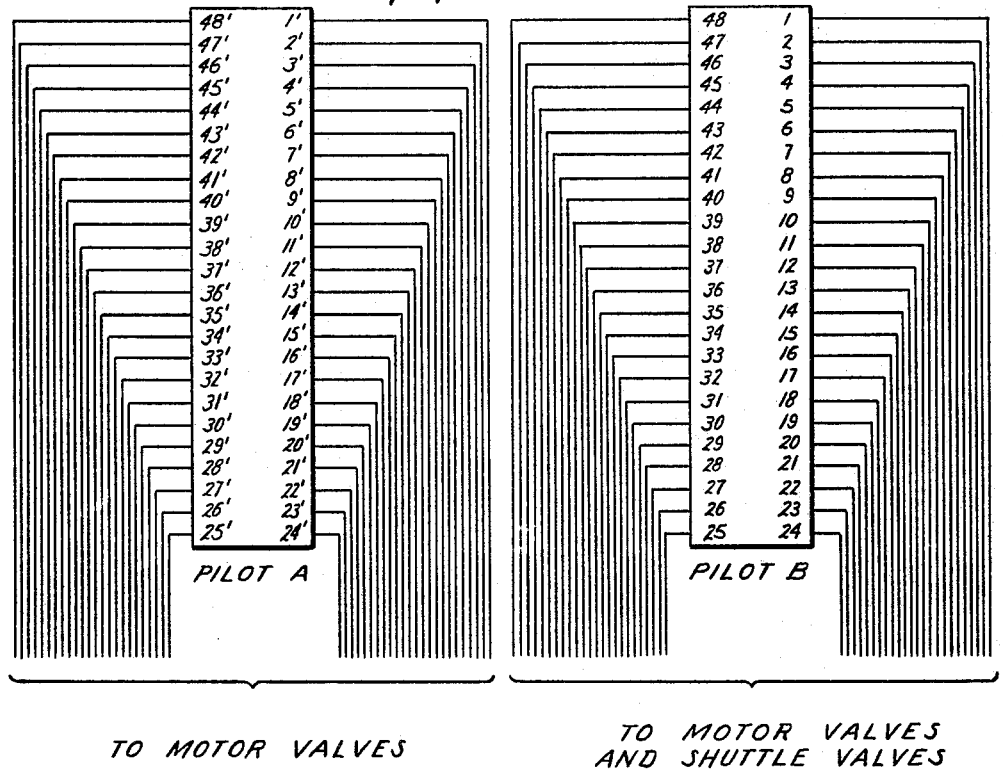

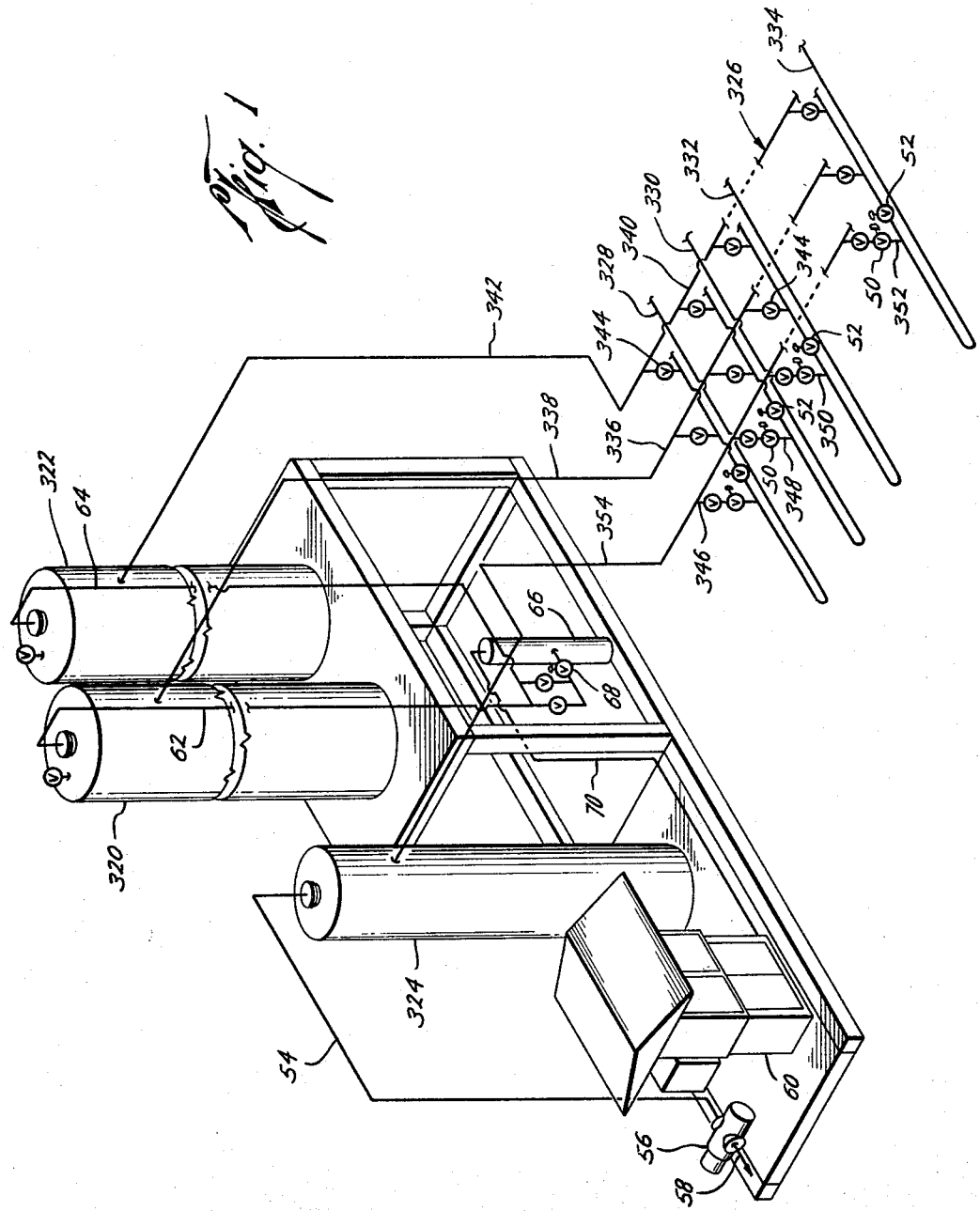

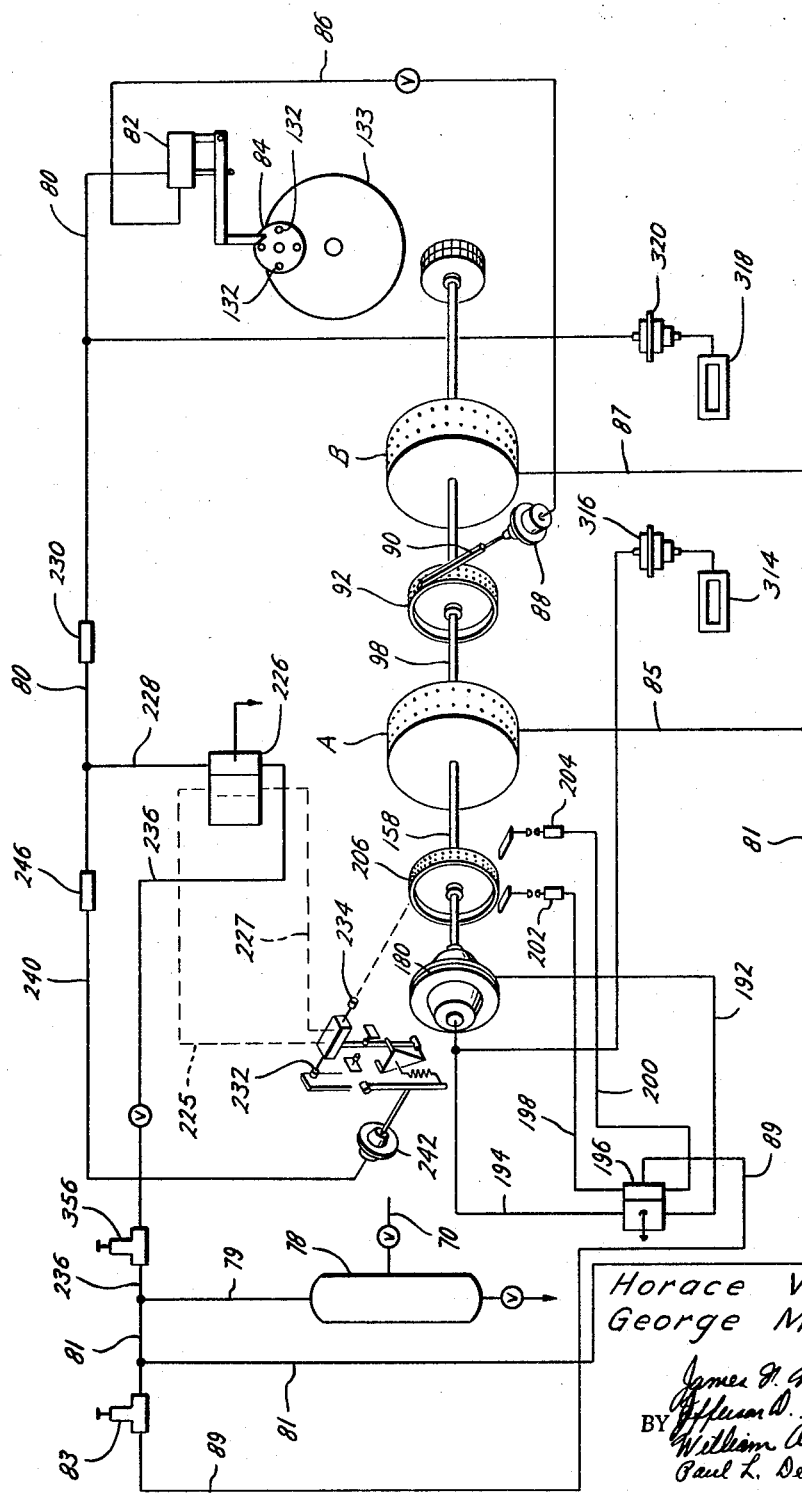

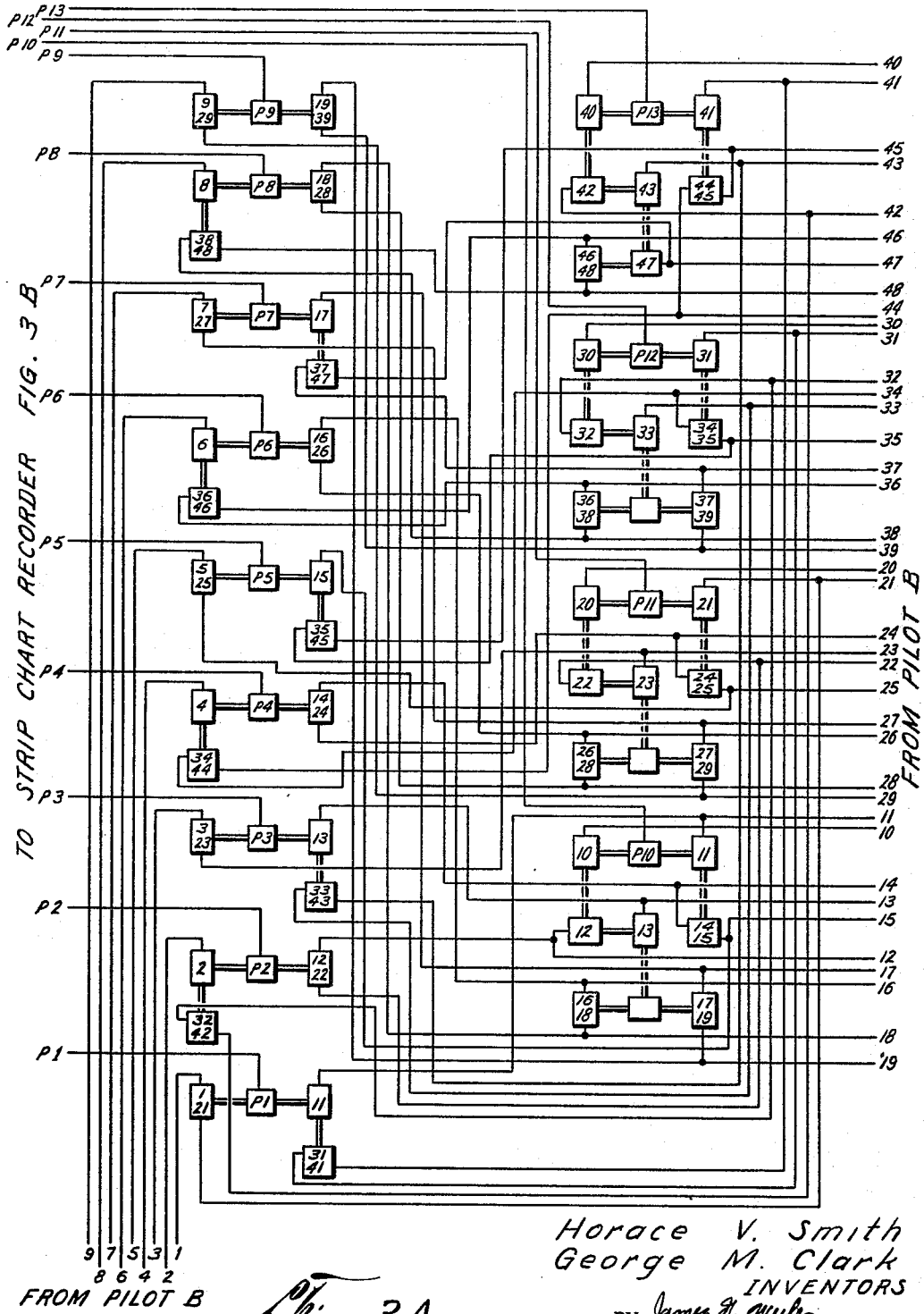

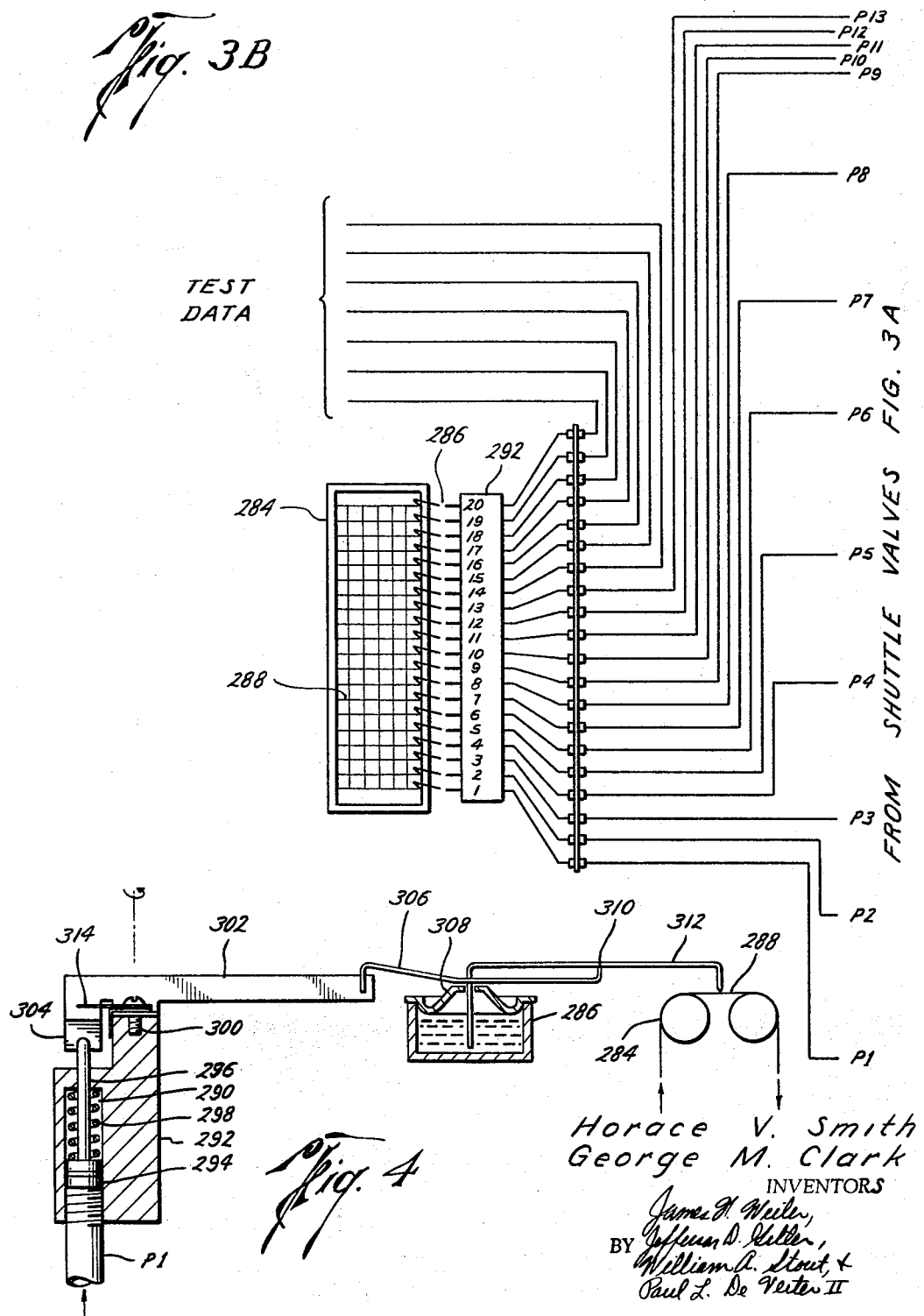

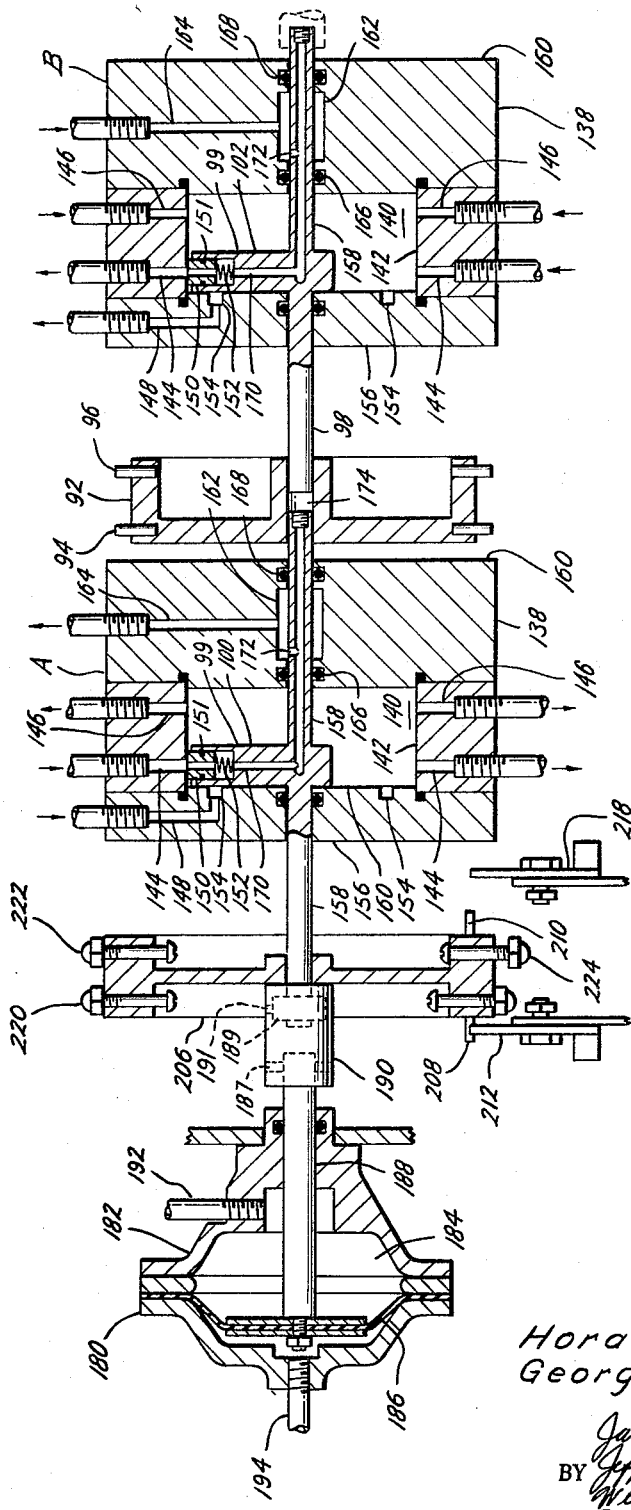

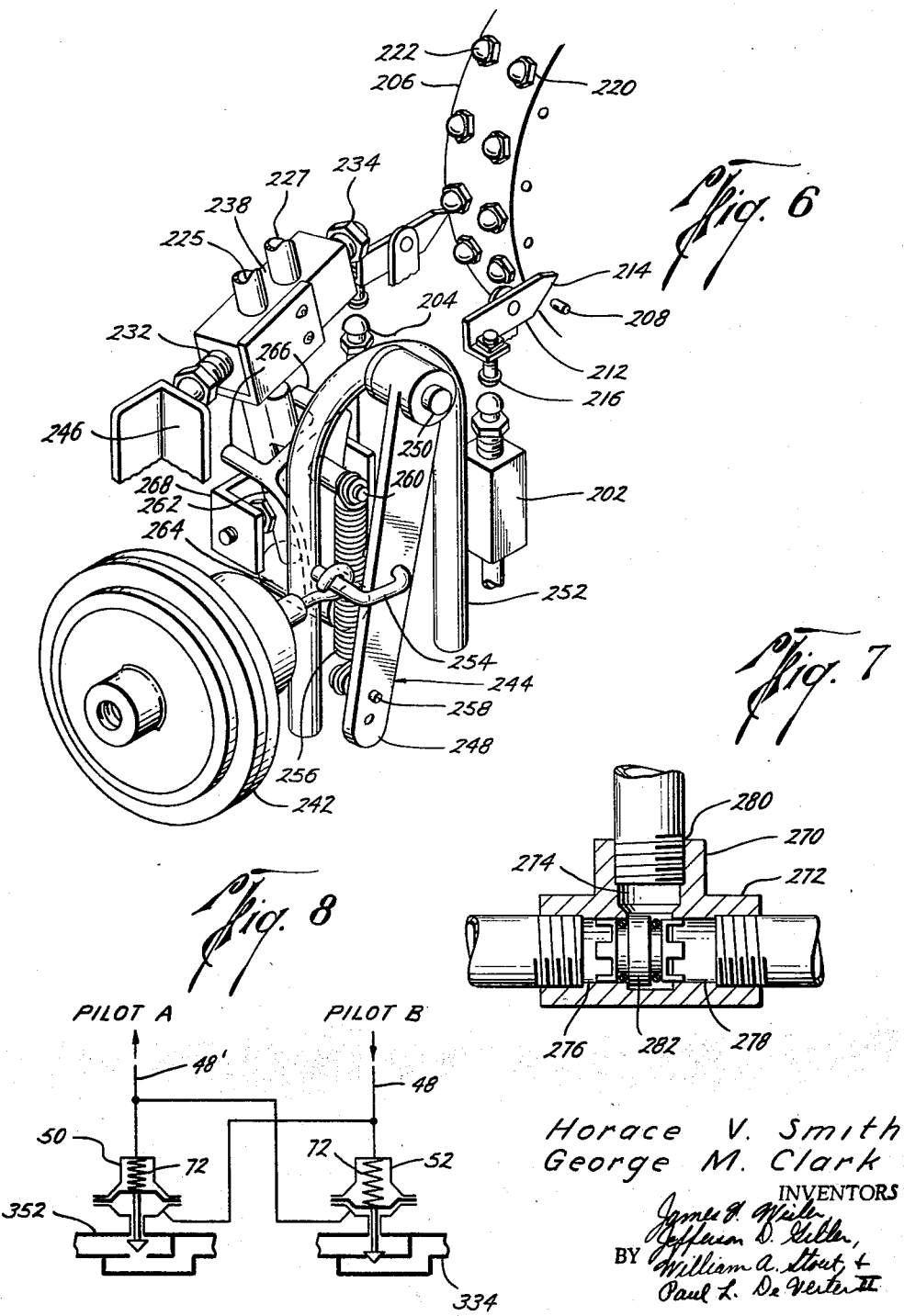

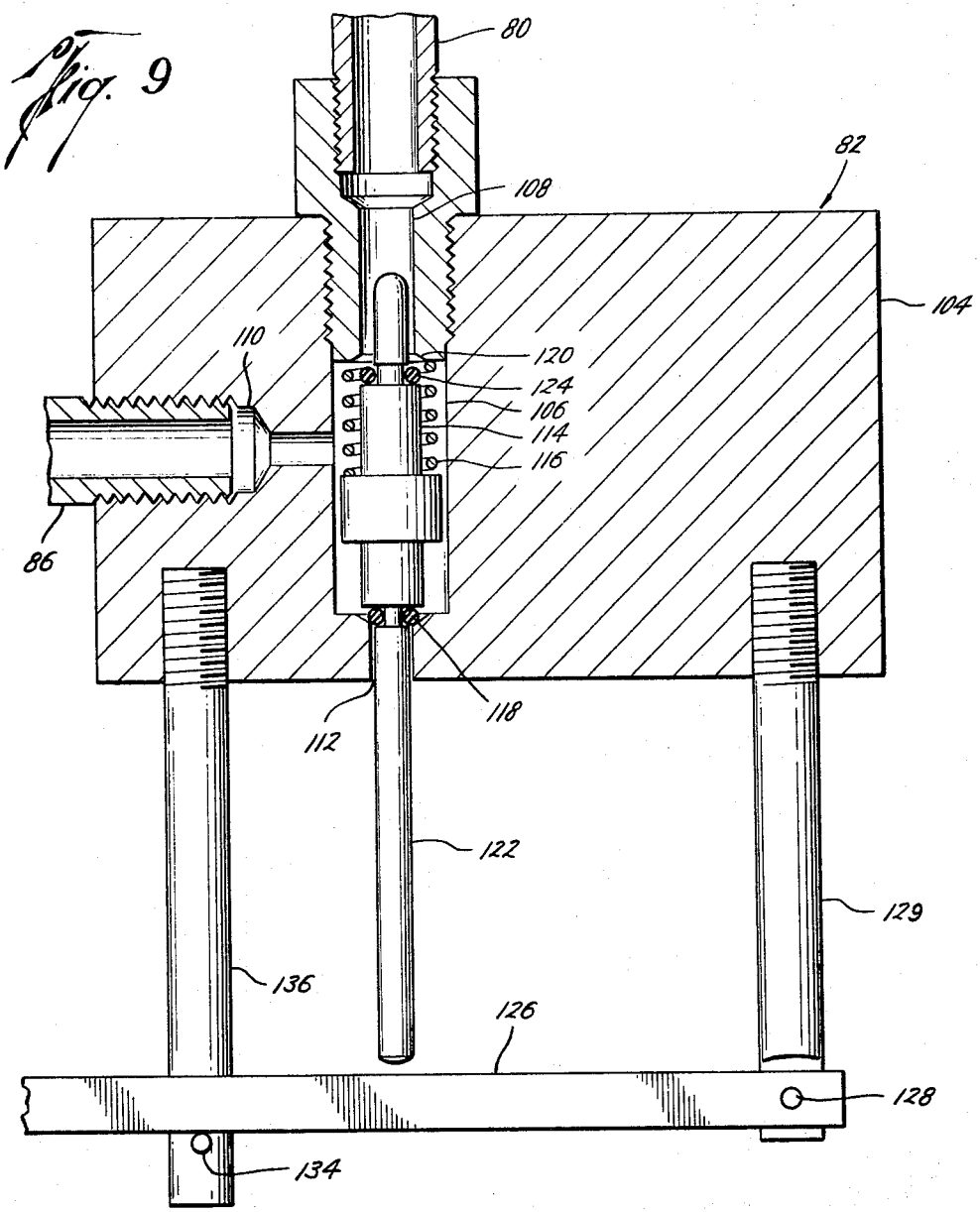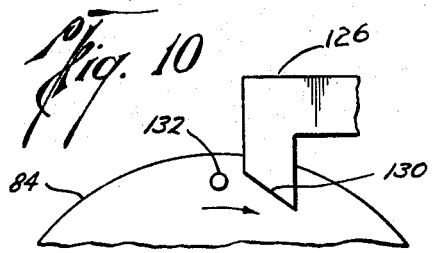

TO MOTOR VALVES — PILOT A

TO MOTOR VALVES AND SHUTTLE VALVES — PILOT B

Horace V. Smith
George M. Clark
INVENTORS

United States Patent Office 3,265,086
Patented August 9, 1966

3,265,086
FLUID FLOW CONTROL SYSTEM
Horace V. Smith and George M. Clark, Houston, Tex., assignors to Metrol Corporation, Houston, Tex., a corporation of Texas
Filed Jan. 7, 1964, Ser. No. 336,179
25 Claims. (Cl. 137—552)

This invention relates to a fluid control system and more particularly to such a system for operating a plurality of pressure responsive devices.

It is a general object of the present invention to provide such a fluid control system having improved control means for programming the application of pressure to a plurality of pressure responsive devices, means for skipping a normal sequence of applying pressure to the pressure responsive devices, and improved means of indicating which one or ones of a plurality of devices is being operated. The programming may be in response to any desired signal, such as one based on time measured by an electric, mechanical, or fluid powered or wound clock or signals based on weights, volumes, rates of flow, temperature, etc.

The system of the present invention can be used to operate pressure responsive devices in many situations such as in operating valves for temporarily diverting a flow of fluid from a plurality of sources for testing, blending, distributing, etc. While it is here described in relation to diverting portions of well fluids for testing, its use is not limited to such a purpose.

It is an object of the present invention to provide such a fluid control system having improved control means for programming the temporary diversion of fluid flow sequentially from the various sources, means for skipping the normal sequence of diverting fluid flow when desired without consuming the time normally utilized for such diversion, and improved means of noting which source of fluid is being temporarily diverted.

A more specific object of the present invention is to provide a system in which a novel pilot valve arrangement permits the actuation of a large number of motor valves for controlling flow from various sources while still maintaining a comparatively small pilot valve. Because of their bulk, large pilot valves are quite often highly undesirable.

A further object is to provide such a novel pilot valve arrangement including a pilot valve having a plurality of rows of ports, a movable valve element movable along each of the rows of ports and establishing fluid communication with one port at a time and means to shift the movable valve element from alignment with one row of ports into alignment with each of the other rows of ports.

Another object of the present invention is to provide a flow control system utilizing a fluid pressure operated skip assembly for quickly skipping any programmed operation of a pressure responsive device.

A further object is to provide such a skip assembly utilizing a disc or wheel adapted to carry on its surface actuators corresponding to each of the pressure responsive devices so that when it is desired to skip the operation of one or more pressure responsive devices it is only necessary to place corresponding actuators on the disc.

Another object of the present invention is to provide a system in which the device being operated is indicated upon a recording strip by the use of combinations of indicators (such as pens) rather than a single indicator for each device so that a large number of devices may be indicated with comparatively few indicators.

A still further object is to provide such an assembly for indicating the device being operated which utilizes a plurality of shuttle valves.

Figure 12:
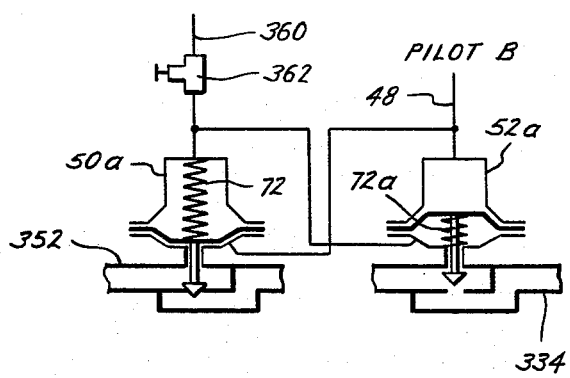

Other and further objects, features and advantages will be apparent from the following description of the presently preferred examples of the present invention, given for the purpose of disclosure and taken in conjunction with the accompanying drawings, where like character references designate like parts throughout the several views and where:

FIGURE 1 is a partially diagrammatic perspective view of an oil well fluid production and test assembly utilizing the present invention, FIGURE 2 is a partially diagrammatic perspective view illustrating the novel pilot valve and skipping arrangements of the present invention, FIGURES 3-A and 3-B are partially diagrammatic illustrations of an example of the improved indicating system of the present invention, FIGURE 4 is a sectional view, partially diagrammatic, of one of the recording pen assemblies, FIGURE 5 is a sectional elevation illustrating a portion of the rotary pilot valves and skip assembly of the present invention, FIGURE 6 is a perspective view of another portion of the skip assembly, FIGURE 7 is a sectional elevation of the preferred form of shuttle valve used with the indicating system, FIGURE 8 is a partially schematic sectional elevation of two of the preferred motor valves used to control fluid flow, FIGURE 9 is a sectional elevation of a control valve used in the programming of withdrawal of the operation of pressure responsive devices, FIGURE 10 is an elevational view of a portion of the control used to operate the valve of FIGURE 9, FIGURE 11 is a diagram of the fluid pressure lines from the rotary pilots, and FIGURE 12 is a partially schematic elevation of a modification of two of the motor valves of FIGURE 11.

Referring now to FIGURE 1 there is shown an example of the use of the flow control system of the present invention with a production and test assembly including a programmer-controller-recorder used in controlling and testing the production from up to 48 oil wells.

Oil and gas from various oil wells flow into and through a low pressure production separator 320 or a high pressure production separator 322 depending upon the pressure of the particular well. Those wells that are high pressure wells simultaneously flow into the separator 322 and the flow from the remaining wells goes into the separator 320 except for the flow from the one well (either high or low pressure) that is then being tested. The production separators 320 and 322 are conventional, do not themselves constitute the present invention, and no further description of them is necessary.

Flow from the well that is being tested will flow into the tester 324 which is a metering separator containing a liquid-gas separator in its upper end and a "fill and dump" type of meter in its lower end. In the tester 324 the liquid and gas are separated with the gas passing out the top through a line 54 to a gas meter 56 and from there to a gas line 58. The liquids are withdrawn from the meter portion, by a line not shown, and passed to storage. This tester 324 and the gas meter 56 are conventional, do not constitute the present invention, and no further description of it is necessary.

Oil and gas from each of 48 wells enters a manifold section, indicated generally by the numeral 326 through 48 lines or flow conduits such as the flow conduits 328, 330, 332, and 334 connected to four of these wells. Fluid from those wells under low pressure flows into a low pressure manifold 336 and through the line 338 to the low pressure separator 320. Fluid from those wells under high pressure flows into a high pressure manifold 340 and through the line 342 to the high pressure separator 322. Liquids and gases flow, by lines not shown, from the production separators 320 and 322 to storage or to transportation lines. Manually operated 2-way plug valves 344 are used to connect each well with the desired low pressure manifold 336 or high pressure manifold 340.

Each flow conduit is connected to a withdrawal conduit such as the withdrawal conduits 346, 348, 350, and 352 connected to the flow conduits 328, 330, 332, and 334 respectively. Fluid is sequentially withdrawn from each of the flow conduits and allowed to flow through the withdrawal conduit connected to that flow conduit and through the line 354 to the tester 324 by operation of a motor valve 50 in each withdrawal conduit and a motor valve 52 in each flow conduit. These motor valves 50 and 52 are pressure responsive motor diaphragm valves. Each motor valve 52 in each flow conduit is located downstream of the point of connection with the withdrawal conduit with that flow conduit.

In operation, the well being tested will have the motor valve 50 in its withdrawal conduit opened and the motor valve 52 in its flow conduit closed so that the production from that well flows through the tester 324 rather than through either of the production separators 322 or 324. All other motor valves 50 in the other withdrawal conduits will be closed and all other motor valves 52 in the other flow conduits will be open so that all the other wells are connected to the production separators 322 and 324. When the test of a well has been completed the motor valve 50 in its withdrawal conduit is closed and the motor valve 52 in its flow conduit is opened so that the production from that well will go through the proper production separator 322 or 324 rather than through the tester 324. Simultaneously with the taking of that particular well off test another well will automatically be placed on test by opening the motor valve 50 in its withdrawal conduit and closing the motor valve 52 in its flow conduit.

The various apparatus for controlling operation of the motor valves 50 and 52 and recording and noting the results of the tests is contained in the cabinet 60. This apparatus is principally powered by fluid pressure supplied from the production separators 320 and 322. To accomplish this a gas line 62 from the separator 320 and a gas line 64 from the separator 322 are connected to a conventional gas scrubber 66 through a pressure regulating valve 68. Scrubbed gas from the scrubber 66 flows through line 70 to the cabinet 60 for operation of this apparatus.

Referring now to FIGURE 8, there is illustrated the preferred motor diaphragm valves 50 and 52 in withdrawal conduit 352 and flow conduit 334 respectively. These motor diaphragm valves 50 and 52 are spring loaded with the spring 72 in each valve urging the valve closed. Fluid pressure line 48 from rotary pilot valve B (later described) connects with the motor valve 52 above the diaphragm and with the motor valve 50 below the diaphragm. Pressure line 48' from rotary pilot valve A (later described) connects with motor valve 50 above its diaphragm and with motor valve 52 below its diaphragm. Pressure in line 48 with exhaust of pressure through line 48' closes motor valve 52 and opens motor valve 50. Reversal of pressure through lines 48 and 48' reverses operation of the motor valves 50 and 52. In this arrangement both the springs 72 and pressure urge the valves 50 and 52 closed. However, if desired, the springs 72 may be omitted from either or both motor valves.

In FIGURE 12 is shown a modification of the motor valves 50 and 52 of FIGURE 8. Motor valve 50–a is in all respects identical to motor valve 50 of FIGURE 8 except that the pressure supplied to the diaphragm through the pressure line 360 to valve 50–a is a constant pressure rather than a varying pressure. The motor valve 52–a is in all respects identical to motor valve 52 except that the spring 72–a is located below the diaphragm rather than above it and a constant pressure is supplied below the diaphragm through the pressure line 360 to valve 52–a rather than a varying pressure.

In this arrangement drainage of pressure in line 48 will permit the spring 72–a and the pressure on the same side of the diaphragm as the spring 72–a to open valve 52–a in the flow conduit 334 and will permit the spring 72 together with the constant pressure on the same side of the diaphragm as spring 72 to close valve 50–a in withdrawal conduit 432. When line 48 is supplied with fluid pressure of sufficient amount the force of the spring 72–a and the constant pressure on the same side of the diaphragm as the spring 52–a will be overcome and the valve 52–a will close. This same pressure in the line 48 will overcome the force of the spring 72 and the constant pressure on the same side of the diaphragm as the spring 72 in valve 50–a and open it.

Any suitable source of constant pressure for the line 360 may be used. Preferably the line 360 is connected to pressure line 81 (FIGURE 2) through a pressure reducing regulator 362.

If desired, either of the springs 72 or 72–a may be omitted or, instead of omitting the springs, the line 360 may be omitted.

Referring now to FIGURE 2 there is illustrated some of the apparatus within the cabinet 60 of FIGURE 1. Gas pressure from the scrubber 66 in FIGURE 1 flows through line 70 into a condensate chamber 78, leaves the condensate chamber 78 through line 79, enters line 236, passes through a pressure reducing regulator 356, flows through a pressure responsive pilot valve 226, enters line 228, flows from line 228 into line 80, passes through a flow control valve 230, and supplies pressure to a control valve 82 (here shown as a time cycle control valve) which is operated by a clock driven time wheel 84. At predetermined intervals of time the time wheel 84 operates the time cycle control valve 82 to permit it to send pressure through and drain pressure from line 86 connected to a pressure responsive spring loaded actuator 88. This actuator 88 is connected to a ratchet wheel pawl 90 with a spring (not shown) in the actuator 88 retracting the pawl 90 when pressure is drained from the line 86 and the pawl 90 being advanced when pressure is applied through the line 86. No further description of this actuator 88 is needed as such devices are well known.

The pawl 90 rides on a ratchet wheel 92 containing first and second rows 94 and 96 of circumferentially spaced and aligned pins respectively (see FIGURE 5) with the second row 96 of pins being laterally spaced from, and parallel to, the first row 94 of pins. Each of the rows 94 and 96 contain 24 equally spaced pins. The pawl 90 is always aligned with one row 94 or 96 of pins and upon advancement of the pawl 90 the ratchet wheel 92 is advanced one position, here 1/24 of a revolution.

This ratchet wheel 92 is secured to shaft 98 which is connected to the rotor 100 in a rotary pilot valve A and, through shaft 158, to the rotor 102 in rotary pilot valve B (see FIGURE 5) so that upon advancement of the pawl 90 motor valves 50 and 52 are actuated by fluid pressure from pilots A and B (as later described) to stop the flow of fluid from one withdrawal conduit and permit it to flow through the flow conduit connected to that withdrawal conduit and simultaneously stop the flow through another flow conduit and allow the fluid to flow through the withdrawal conduit connected to that flow conduit.

Referring now to FIGURES 9 and 10 there is shown in more detail the time cycle control valve 82 and the time wheel 84. The block 104 of the time cycle control valve 82 contains a valve chamber 106 at the top of which is provided a port 108 to which the pressure line 80 is connected. At one side of the valve chamber 106 is a port 110 to which pressure line 86 is connected. At the lower end of the valve chamber 106 and extending through the block 104 is a vent 112. Within the valve chamber 106 is a valve element 114 urged downwardly by a spring 116 closing the vent 112 by the sealing ring 118 at the lower end of the valve element 114 so that when the valve element 114 is in the position illustrated in FIGURE 9 fluid pressure can flow from line 80 to line 86 through an orifice 120 and around the valve element 114.

Connected to the lower end of the valve element 114 and loosely and slidably extending through the vent 112 is a push rod 122. When this push rod is moved upwardly it carries the valve element 114 upwardly until the sealing ring 124 closes the orifice 120 which prevents pressure in the line 80 from entering the valve chamber 106 and allows pressure in the line 86 to drain out the vent 112.

Under and adjacent the lower end of the push rod 122 is an L-shaped cam bar 126 pivotally mounted at its right end by a pin 128 secured to a post 129. The other end of the cam bar 126 has a beveled end 130 adjacent one side of the time wheel 84. At spaced intervals on the side of the time wheel 84 are pins 132 which, upon rotation of the time wheel 84, contact the beveled end 130 at spaced intervals of time and raise the cam bar 126 which lifts the push rod 122 stopping pressure in line 80 from entering line 86 and permitting pressure to drain from line 86 through vent 112. This permits retraction of the pawl 90. As the time wheel 84 continues to rotate the pin 132 which has raised the cam bar 126 will pass beyond the end 130 and allow the bar 126 to fall to its former position. This permits push rod 122 to lower closing the vent 112 and opening the line 86 to pressure from line 80 causing the pawl 90 to advance and turn the ratchet wheel 92 one position. Pressure remains in the line 86 until the next pin 132 raises the cam bar 126. Downward movement of the end 130 of the cam bar 126 beyond the desired point is prevented by a stop 134 carried by a post 136 secured to the block 104.

By varying the spacing of the pins 132 the time intervals between the ventings of line 86 may be varied.

Referring now to FIGURE 5 there is shown in more detail the preferred form of rotary pilot valves for sequentially directing pressure to and draining it from the motor valves 50 and 52 for operation of those motor valves. Pilot valve A is a rotary pilot valve having a casing 138 containing a cylindrical valve chamber 140 having a cylindrical lateral wall 142. Through the wall of the casing is a first row 144 of circumferentially spaced and aligned ports and a second row 146 of circumferentially spaced and aligned ports, the second row 146 of ports being laterally spaced from, and parallel to, the first row 144 of ports. Within each row 144 and 146 there are 24 equally spaced ports. A fluid passageway 148 communicates through the casing 138 with the valve chamber 140. The inner end of the passageway terminates in an annular groove 154 in the end 156 of the pilot A and within the valve chamber 140.

In the valve chamber 140 is an arm-shaped rotor 100 with its axis of rotation coinciding with the axis of the valve chamber 140. In the outer end of the arm 99 of the rotor 100 is a spring loaded tubular thrust plug 150 continually urged outwardly by the spring 152 so that the thrust plug 150 forms a projection with an orifice in it and the projection rides against the cylindrical wall 142. The thrust plug 150 has a lesser cross-sectional dimension than the distance between the ports in either row 144 of 146 so that when the thrust plug 150 is over one of such ports the other ports are uncovered.

The rotor 100 is secured to the shaft 158 along its axis of rotation which shaft 158 slidably and rotatably extends through the ends 156 and 160 of the casing 138. Within the end 160 of the casing 138 and around the shaft 158 is an annular slot 162 communicating with a port 164 extending to the outside of the casing 138. The escape of fluid pressure from this annular slot 162 along the shaft 158 is prevented by seal rings 166 and 168. A passageway 170 in the rotor 100 and the shaft 158 communicates with the tubular thrust plug 150 and the annular groove 162 through a port 172 cut in the shaft 158 so that the port 164, the annular slot 162, the port 172, the fluid passageway 170, and the tubular plug 150 form one continuous passageway between the exterior of the pilot valve A and the end of the thrust plug 150. Escape of fluid pressure around the thrust plug 150 is prevented by a seal ring 151.

Rotary pilot valve B is in all respects identical to rotary pilot valve A and like parts are given like numbers except that the shaft of pilot B is numbered 98 and the rotor is numbered 102.

The rotor shafts 98 and 158 are secured to each other by a coupling 174 in the ratchet wheel 92 so that rotation of the ratchet wheel 92 rotates both rotors 100 and 102 as a unit and longitudinal movement of the shaft 158 causes the rotors 100 and 102 to shift longitudinally as a unit.

In pilot valve A fluid pressure is always supplied to the valve chamber 140 through the passageway 148 and annular groove 154 so that all the ports in the rows 144 and 146 in pilot valve A receive pressure except the port covered by the thrust plug 150. Port 164 in pilot valve A is always an exhaust port so that the particular port in row 144 or row 146 in pilot valve A covered by the plug 150 is always drained of pressure.

The application of fluid pressure in pilot valve B is the opposite to that of the pilot valve A. In pilot valve B fluid pressure is always drained through the annular groove 154 and passageway 148 so that all the ports in the rows 144 and 146 except the one port covered by the thrust plug 150 are always being drained. Port 164 is always supplied with fluid pressure so that the particular port in the rows 144 and 146 covered by the thrust plug 150 is always supplied with pressure.

As shown in FIGURE 11 the ports in row 146 of pilot valve A are numbered 1' through 24' and the ports in row 144 are numbered 25' through 48'. Similarly in pilot valve B the ports in row 146 are numbered 1 through 24 and the ports in row 144 are numbered 25 through 48. Each of the ports 1' through 48' in pilot valve A and each of the ports 1 through 48 in pilot valve B is connected to a pressure line, each pressure line being identified for ease of understanding by the same number as the port to which it is connected. Each port in pilot valve A is connected through its pressure line to a motor valve 50 and a motor valve 52 in the manner shown in FIGURE 8 and likewise each port in pilot B through its pressure line is connected to a motor valve 50 and a motor valve 52 as shown in FIGURE 8 so that the same numbered port in pilot B as the port in pilot A bearing that number primed are connected to the same motor valves 50 and 52.

Shifting means are provided to shift each of the rotors 100 and 102 from alignment with a row 144 of ports into alignment with a row 146 of ports and back again by reciprocating motion of the shafts 158 and 98. A pressure responsive shaft actuator 180 having a casing 182 containing a diaphragm chamber 184 in which is a flexible diaphragm 186 to which is secured a shaft 188 extending through the casing 182, is placed so that the shaft 188 is connected through a coupling 190 to the rotor shaft 158 (FIGURE 5).

The shaft 188 is secured to the coupling 190 by a key 187. Within and secured to the coupling 190 by pin 191 is a bearing 189 mounted on the end of the shaft 158. This coupling arrangement causes longitudinal movement of the shaft 188 to be transmitted to the shaft 158 but permits the shaft 158 to rotate with respect to the shaft 188.

The diaphragm 186 is caused to move into the position shown in FIGURE 5 by the application of fluid pressure through the line 192 and the draining of fluid pressure from the line 194. Reversal fluid pressure in lines 192 and 194 causes the diaphragm 186 to move to the right and shift the rotors 100 and 102 in pilot valves A and B respectively from alignment with the row 144 of ports to alignment with the row 146 of ports.

Referring now to FIGURE 2 there is provided a pressure responsive pilot valve 196 to which the pressure lines 192 and 194 are connected. Fluid pressure is continuously supplied to this pilot valve 196 from pressure line 89 connected to pressure line 81 which is in turn connected to pressure line 79. This pilot valve 196 is adapted in a first position to drain pressure from line 194 and supply it to line 192 and in a second position to supply pressure to line 194 and drain it from line 192. This pilot valve 196 is moved between the first and second positions upon alternate bleeding of pressure from the operative pressure lines 198 and 200 connected to it. Such a pressure responsive pilot valve as pilot valve 196 is conventional and no further description thereof is necessary. For example, the Midget Meadmatic "420" valve made by Mead Specialties Co., 4114 North Knox Avenue, Chicago 41, Illinois, is quite satisfactory.

Secured to the end of lines 198 and 200 are button type bleed valves 202 and 204 respectively. Upon alternate actuation of these bleed valves 202 and 204 they cause the pressure responsive pilot valve 196 to alternately shift between its first and second positions. These bleed valves are actuated at the completion of each rotation of the rotors 100 and 102 in the pilot valves A and B and preferably work off the disc or skip wheel 206 illustrated in FIGURES 2, 5 and 6. The skip wheel 206 is secured to and rotates with the shaft 158 and carries on its sides adjacent its circumference two outwardly extending aligned skip pins 208 and 210, one on each side. Adjacent one side of the skip wheel 206 is a pivotally mounted trip lever 212 having a beveled end 214 adapted to be contacted by the skip pin 208 upon one rotation of the skip wheel 206. The other end of the trip lever 212 carries a contact 216 which operates the bleed valve 202 during the time the beveled end 214 of the trip lever 212 is raised by the skip pin 208. On the other side of the skip wheel 206 is an identical trip lever 218 spaced from trip lever 212 a sufficient distance to allow for the width of the skip wheel 206 and the length of the movement of the shaft 158 when the shaft 158 is moved to cause the rotors 100 and 102 in the pilot valves A and B to shift from alignment with the row 144 of ports into alignment with the row 146 of ports. As thus constructed, when the rotors 100 and 102 have completed one rotation and the skip wheel 206 is in the position shown in FIGURE 5 the skip pin 208 will move the trip lever 212 to operate bleed valve 202 which will in turn cause pressure responsive pilot valve 196 to shift from one position to another and actuate the pressure responsive shaft actuator 180 causing the shafts 158 and 98 to shift to the right from the position shown in FIGURE 5. This will place the skip pin 210 in alignment with the trip lever 218 and upon completion of another complete rotation of the rotors 100 and 102 the skip pin 210 will contact the trip lever 218 and cause it to operate the bleed valve 204 which will shift the pressure responsive pilot valve 196 to its other position causing the pressure responsive actuator 180 to retract the shaft 158 and move the rotors 100 and 102 back into the position shown in FIGURE 5.

Obviously, if desired, the pressure responsive shaft actuator 180 could be identical to the pressure responsive actuator 88, that is, spring loaded in one direction, and one of the lines 194 or 192 would not be needed, as pressure would move the diaphragm 186 in one direction and the spring would move it in the opposite direction.

Because it may not be desirable to withdraw fluid from some of the flow conduits the present invention provides a skip assembly for quickly skipping any of the programmed diversions from a fluid conduit without consuming the time ordinarily consumed if the withdrawal from the flow conduit had taken place.

The skip wheel or disc 206 carries on its circumference first and second rows 220 and 222 respectively of circumferentially spaced and aligned bolts threaded into the rim of the wheel 206 (FIGURES 5 and 6). Each of the bolts in the rows 220 and 222 is spaced from the adjacent bolt in the same row the same rotational angle that each of the ports in the rows 144 and 146 is spaced from the adjacent port so there is a bolt in row 220 and a bolt in row 222 corresponding to each of successive positions of the rotational movement of the rotors 100 and 102. The bolts in the rows 220 and 222 are normally screwed into the skip wheel 206 but when it is desired to skip any of the ports in the rows 144 and 146 the bolt in the skip wheel 206 corresponding to that port is unscrewed so that it extends and forms a projection from the wheel 206 as illustrated by the bolt 224 in FIGURE 5. For as many ports in the rows 144 and 146 as it is desired to skip, a corresponding bolt in row 220 or 222 is caused to project from the wheel 206 and become a bleed valve actuator as later explained.

Referring now to FIGURE 2, the pilot valve 226 is adapted in a first position to drain fluid pressure from a line 228 and in a second position to supply pressure to that line. This pilot valve 226 is moved between the first and second positions upon alternate bleeding of pressure from the flexible operative pressure lines 225 and 227 connected to it. This pressure responsive pilot valve 226 is conventional and no further description thereof is necessary. Valve No. 400 made by Mead Specialties Co., 4114 North Knox Avenue, Chicago 41, Illinois, with one of its two outlets plugged is quite satisfactory.

Secured to the end of pressure lines 225 and 227 are the button type bleed valves 232 and 234 respectively. Upon alternate actuation these bleed valves 232 and 234 cause the pressure responsive pilot valve 226 to shift between its first and second position.

Fluid pressure in line 80 passes through a flow rate control valve 230 before it reaches the time cycle control valve 82. The flow control valve 230 is of conventional construction and allows full flow on bleeding pressure from line 80 but causes restricted flow when pressure is applied to line 80. When the time wheel 84 (FIGURES 2, 9, and 10) advances so that it causes the time cycle control valve 82 to bleed pressure from the line 86 and thereafter supply pressure to that line causing the pawl 90 to advance the ratchet wheel 92, the rate of flow in line 80, because of the flow rate control valve 230, is such that the actuator 88 does not give a sharp blow to any of the pins in the rows 94 or 96 on the ratchet wheel 92 but instead moves the pawl 90 forward slowly so that the ratchet wheel 92 only turns sufficiently to line the rotors 100 and 102 with the next port in the rows 144 or 146. If those next ports in the rows 144 or 146 are to be skipped the pressure responsive pilot valve 226 (as later described) drains pressure from lines 228, 80, and 86, causing the pawl 90 to retract and shortly thereafter the pressure responsive pilot valve 226 is actuated to again pressure the lines 228, 80, and 86 causing the pawl 90 to advance the ratchet wheel 92 to the next position without actuation of the time cycle control valve 82.

Referring now to FIGURES 2 and 6, the button bleed valves 232 and 234 are carried by a movable member 238 adjacent the skip wheel 206 which movable member 238 is mounted for reciprocating movement toward and away from the rows 220 and 222 of bolts. In its forward position, that is closest to the wheel 206, the movable member 238 places the button bleed valve 234 close enough to the wheel 206 to be contacted by any of the bolts in the rows 222 or 224 that are extended but not close enough to be contacted by any such bolts that are not extended. When a projecting bolt on the wheel 206 contacts the button bleed valve 234 that button bleed valve causes the pressure responsive valve 226 to change position and drain pressure from the lines 228 and 240. The latter line is connected to a spring loaded pressure responsive actuator 242 which is identical to the actuator 88 operating the ratchet wheel 92. This bleeding of the line 228 also simultaneously bleeds line 80 as previously described. When line 240 is drained of pressure the actuator 242, through its connection with the snap acting device generally indicated by the numeral 244, moves the movable member 238 away from the wheel 206 and causes the button bleed valve 232 to strike the contact 246 which operates the button bleed valve 232 to reverse the pressure responsive pilot valve 226 causing pressure lines 228, 80, and 240 to be pressured. This pressure advances the pawl 90 and actuates the pressure responsive actuator 242 to move the movable member 238 forward to its position adjacent the skip wheel 206 which by that time has advanced the protruding bolt to where it will not contact the button bleed valve 234.

In the line 240 is a flow rate control valve 246 which allows full flow on bleed and a partial flow on pressure to the pressure responsive actuator 242 which partial flow is at a lesser rate than the flow through the flow control valve 230 to make certain that the wheel 206 is sufficiently advanced by the time the movable member 238 is moved forward that the extended bolt which actuated the button bleed valve 234 is out of the way of that bleed valve.

The snap acting device 244 here illustrated includes a swing arm 248 pivotably mounted on a pin 250 supported by a yoke 252. To the swing arm 248 the diaphragm actuator 242 is connected by linkage 254 so that movement of the linkage 254 causes the swing arm 248 to move forward and back. One end of a tension spring 256 is secured to the lower portion of the swing arm 248 by a pin 258 and the other end of the spring 256 is secured to a pin 260 extending from a pivot arm 262 pivotally mounted at its lower end on a pin 264. Secured to and projecting from the upper end of the pivot arm 262 is a pair of spaced pins 266 which form contact members that straddle and actuate the movable member 238. A yoke 268 limits the forward and backward extent of the motion of the movable member 238.

After a predetermined amount of forward movement of the linkage 254 the snap acting device 244 will snap the movable member 238 toward the skip wheel 206 and upon backward movement of the linkage 254 the snap acting device 244 will, after predetermined movement of the linkage 254, snap the movable member 238 away from the skip wheel 206. No further description of this snap acting device 244 or its method of operation is necessary as such device is described and claimed in Patent No. 2,818,738 granted January 7, 1958 for a Snap Acting Mechanism.

In FIGURES 3-A, 3-B, 4, 7, and 11 is illustrated a system by which each flow conduit from which fluid is being withdrawn through the withdrawal conduit is indicated without the necessity of one marking device or indicator such as a pen for each such flow conduit. In the present example there are 48 wells but only 13 pens are necessary to indicate which of the flow conduits is having the flow diverted from it.

As previously stated, each of the pressure lines 1 through 48 from pilot B (FIGURE 11) is connected to a motor valve 50 and a motor valve 52. Also, each of these pressure lines 1 through 48 is connected, as shown in FIGURE 3-A, to one or more shuttle valves.

In FIGURE 7, there is illustrated a shuttle valve 270 which has a casing 272 in which is formed a passageway 274 in the shape of an inverted "T" forming two inlets 276 and 278 respectively and an outlet 280. Within the passageway 274 and in alignment with the inlets 276 and 278 is a piston 282. Upon the application of fluid pressure to inlet 278 and the draining of fluid pressure from inlet 276 the piston 282 moves to the left as shown in FIGURE 7 to permit the fluid pressure to flow from inlet 278 and out outlet 280 but the piston 282 blocks pressure in inlet 278 from flowing into the inlet 276. Upon the application of pressure to the inlet 276 and the draining of pressure from inlet 278 the piston 282 moves to the right as viewed in FIGURE 7 and pressure will flow from inlet 276 out the outlet 280 while the piston 282 prevents that fluid pressure from entering the inlet 278. All the shuttle valves illustrated in FIGURE 3-A are constructed the same as the one illustrated in FIGURE 7.

Referring now to FIGURE 3-B, there is illustrated a strip chart recorder 284 of any conventional type moving a strip chart 288 from right to left. Indicating pens numbered 1 through 20 are each pivotally mounted with one end in an inkwell 286 and the other resting upon the strip chart 288. Each of these pens 1 through 20 leaves a continuous mark on the strip chart 288 as that chart moves from right to left as viewed in FIGURE 3-B. When pressure is applied to a pressure line associated with a pen, as later described, the pen moves slightly across the strip chart to a new position and maintains that position until pressure is removed from the pressure line.

The details of operation and construction of the pens 1 through 20 are illustrated in FIGURE 4. A pressure line, such as the line P1, is threadily secured into the lower end of a cylinder 290 formed in a mounting bar 292. Within the cylinder 290 is a piston 294 carrying a piston rod 296 slidably extending through the upper end of the cylinder 290. A spring 298 in the cylinder 290 urges the piston 294 downwardly against the pressure line P1 but upon the application of fluid pressure through the line P1 to the cylinder 290 the piston 294 and the piston rod 296 are moved upwardly.

Pivotally mounted on top of the mounting bar 292 for horizontal movement with its point of pivot at the bolt 300 is an L-shaped pivot arm 302 having a beveled end 304 contacting the upper end of the piston rod 296. The other end of the pivot arm 302 is pivotally connected to one end of a pivot rod 306 pivotally mounted on the cap 308 of the inkwell 286. The other end of the pivot rod 306 is pivotally secured at 310 to the first pen, here indicated by the numeral 312. One end of the pen 312 rests in the inkwell 286 and forms a pivot for the pen. The other end of the pen rests on the strip chart 288. No further description of the pivot rod 306, the inkwell 286, the pen 312, the strip chart 288, or the strip recorder 284 is necessary as these are conventional commercial items.

When the piston rod 296 is moved upwardly as previously described it pushes against the beveled end 304 of the pivot arm 302 causing the pivot arm 302 to pivot horizontally in the direction indicated by the arrow. This causes the pivot rod 306 to pivot horizontally about its point of pivot on the cap 308 and turn the pen 312 horizontally so that it moves across the strip chart 288 to a new position. It is held in this position until fluid pressure is removed from the piston 294 which causes the piston rod 296 to retract. A return spring 314 secured to the mounting bar 292 and connected to the pivot arm 302 then returns the pivot arm 302 to its original position carrying the pivot rod 306 and the pen 312 to their original positions.

All the pens 1 through 20 illustrated in FIGURE 3-B are actuated, constructed, and mounted in this manner.

Referring now to FIGURE 3-A, there is illustrated the shuttle valve arrangement in a system for indicating X number of fluid pressure sources by the use of $n$ number of pressure responsive indicators, such as pens, in which system $n$ is a number less than X. This system includes (1) a first group of pens numbered 1 through $n'$, each pen in the first group alone indicating one of the pressure sources 1 through $n'$, $n'$ being a number less than $n$, (2) a second group of pens numbered $n'+1$ through $n$ one of which pens from the second group alone or together with one of the pens from the first group indicates the number of sources $n'+1$ through X, (3) for each pen 1 through $n'$, a separate bank of shuttle valves connecting all the pressure sources which actuate each particular pen with that pen, said bank having one less shuttle valve than the number of pressure sources which actuate that pen, each shuttle valve in the bank having its outlet connected to an inlet of another shuttle valve in the same bank except one shuttle valve, a connection between the outlet of that one shuttle valve and the last mentioned pen, and a connection between each pressure source operating the last mentioned pen and a separate inlet of one of the shuttle valves in the bank other than an inlet connected to the outlet of another shuttle valve, and (4) for each indicator $n'+1$ through 1, a separate bank of shuttle valves connecting all the pressure sources which actuate each particular pen with that pen, said bank having one less shuttle valve than the number of sources which actuate that pen, each shuttle valve in each bank having its outlet connected to an inlet of another shuttle valve in the same bank except one shuttle valve, a connection between the outlet of that one shuttle valve and the last mentioned pen, and a connection between each pressure source operating the last mentioned pen and a separate inlet of one of the shuttle valves other than an inlet connected to another shuttle valve.

In the illustration here given X is 48, $n'$ is 9, and $n$ is 13.

In rotary pilot valve B ports 1 through 10 are identified by one of the pens numbered 1 through 10, ports 11 through 19 are indicated by pen 10 together with one of the pens 1 through 9, port 20 is indicated by pen 11, ports 21 through 29 are indicated by pen 11 together with one of the pens 1 through 9, port 30 is indicated by pen 12, ports 31 through 39 are indicated by pen 12 together with one of the pens 1 through 9, port 40 is indicated by pen 13, and ports 41 through 48 are indicated by pen 13 together with one of the pens 1 through 8. The remaining pens 14 through 20 are used to record test data.

On FIGURE 3–A all the lines numbered 1 through 48 are connected to the respective numbered ports in pilot B. Each of the squares or blocks in FIGURE 3–A represents a shuttle valve and the numbers on the shuttle valves indicate the line from pilot B connected to the inlet of that shuttle valve. Those shuttle valves which have no number on them have both inlets connected to the outlet of a numbered shuttle valve. Each shuttle valve having the letter "P" followed by a number such as P4, P11, P12, etc., indicates a shuttle valve which has its outlet connected by a pressure line to a pen bearing the respective number. That is, the outlet of shuttle valve P1 is connected to and operates pen 1, shuttle valve P2 has its outlet connected to and operates pen 2, and so on. For ease of identification each of the pressure lines connecting the outlets of the shuttle valve identified by the letter "P" plus a number to a pen is identied by the same letter and number as the shuttle valve.

In the arrangement of FIGURE 3–A pen 1 will be operated by fluid pressure from ports 1, 11, 21, 31, and 41, and so pen 1 is actuated by 5 pressure sources and uses a bank of 4 shuttle valves. Pressure lines 1 and 21 are connected to one shuttle valve, the outlet from that shuttle valve is connected to the inlet of the shuttle valve P1, lines 31 and 41 are conneced to the inlets of another shuttle valve having its outlet connected to the inlet of shuttle valve 11, line 11 is connected to the other inlet of shuttle valve 11, and the outlet of that shuttle valve is connected to another inlet of shuttle valve P1. It is not necessary that the pressure lines 1, 11, 21, 31, and 41 be connected to the particular shuttle valves illustrated in FIGURE 3–A as it is only necessary that each shuttle valve in this bank of 4 shuttle valves have each outlet connected to the inlet of another shuttle valve in the same bank, except shuttle valve P1 which has its outlet connected to pen 1, and that there is a line connecting each of the lines 1, 11, 21, 31, and 41 to a separate inlet in one of the shuttle valves in that bank other than the inlet connected to the outlet of a shuttle valve.

As examples of the pressure flow in this particular bank of shuttle valves, pressure from line 1 enters one inlet of the shuttle valve marked 1 and 21, leaves the outlet of that shuttle valve and enters the inlet of shuttle valve P1 leaves the outlet of shuttle valve P1, and actuates pen 1 so long as pressure is applied through pressure line 1. Also, pressure from line 31 enters one inlet of the shuttle valve marked 31 and 41, leaves the outlet of that shuttle valve and enters an inlet of shuttle valve 11, leaves the outlet of shuttle valve 11 and enters an inlet of shuttle valve P1, leaves shuttle valve P1 and operates pen 1 so long as pressure is applied to line 31. The flow of pressure from the other pressure lines through the shuttle valves in this bank is accomplished in a similar manner.

The other banks of shuttle valves shown on the left half of FIGURE 3–A, that is those containing the shuttle valves P2 through P9, are similarly arranged. The bank having the shuttle valves indicated as 9 and 29, P9, and 19 and 39 has only 3 shuttle valves as there are 4 ports which operate pen 9 while 5 ports operate each of the remaining pens 1 through 9.

On the right-hand side of FIGURE 3–A are illustrated the banks of shuttle valves for indicating pressure sources or ports 10 through 48. These shuttle valves operate pens 10 through 13. Pens 10, 11, and 12 are each actuated by 10 pressure sources and hence each requires a bank of 9 shuttle valves. Pen 13 is actuated by 9 pressure sources since it is used in indicating only ports 40 through 48 and hence requires 8 shuttle valves.

Examples of the operation of a bank of these shuttle valves and the pen to which it is connected is here explained with respect to pen 10. Pen 10 is operated by pressure from ports 10 through 19 and pressure lines 10 through 19 are connected to the inlets of the shuttle valves bearing those numbers. The outlet of each shuttle valve in this bank is connected to the inlet of another shuttle valve in the same bank, except shuttle valve P10 which has its outlet connected to pen 10, and there is a line connecting each of the lines 10 through 19 to a separate inlet in one of the shuttle valves in that bank other than the inlet connected to the outlet of a shuttle valve, similar to the arrangement with respect to the bank of shuttle valves operating pen 1.

Pressure in line 10 from port 10 enters an inlet of the shuttle valve 10, passes from the outlet of that shuttle valve to an inlet of the shuttle valve P10 and leaves the outlet of the shuttle valve P10 to operate pen 10. However, pressure in line 11 from port 11 is divided and a portion of it enters an inlet of the shuttle valve 11 in the bank of shuttle valves operating pen 10, passes from the outlet of that shuttle valve into an inlet of shuttle valve P10 which operates pen 10. Simultaneously another portion of the pressure from line 11 enters the inlet of shuttle valve 11 in the bank of shuttle valves in the lower left-hand corner of FIGURE 3–A which operates pen 1 and causes pen 1 to also be operated. Thus port 11 is indicated by movement of both pens 10 and 1. Similarly, a portion of the pressure from line 17 enters an inlet of the shuttle valve indicated by the numbers 17 and 19 in the bank of shuttle valves operating pen 10, passes through the outlet of that shuttle valve to the inlet of another shuttle valve, flows from the outlet of the last mentioned shuttle valve into an inlet of shuttle valve 13, moves from the outlet of that shuttle valve into an inlet of the shuttle valve 12, passes from the outlet of that shuttle valve to an inlet of shuttle valve 10, and from the outlet of that shuttle valve flows into an inlet to the shuttle valve P10 to operate pen 10. Simultaneously another portion of the pressure from line 17 enters an inlet to the shuttle valve 17 in the bank of shuttle valves which operate pen 7, passes from the outlet of that shuttle valve into an inlet of the shuttle valve P7, and from the outlet of that shuttle valve P7 to pen 7 so that port 17 is indicated by both pens 10 and 7.

This system is repeated with respect to all the other banks of shuttle valves shown on the right-hand side of FIGURE 3-A, that is ports 20, 30, and 40 are indicated by pens 11, 12, and 13 respectively, ports 11 through 19 move both pen 10 and one of the pens 1 through 9, ports 21 through 29 move both pens 11 and one of the pens 1 through 9, ports 31 through 39 move both pens 12 and one of the pens 1 through 9, and ports 41 through 48 move pen 13 plus one of the pens 1 through 8.

By way of summary of the operation of the present invention, with the use of 48 flow conduits and 48 withdrawal conduits, the ratchet wheel 92 is manually turned and shifted to cause the rotors 100 and 102 in pilots A and B to be aligned with the desired starting ports such as ports 1' and 1. In the event any of the flow conduits are not to have their fluid withdrawn through a withdrawal conduit the proper bolt on the skip wheel 206 is unscrewed to cause it to form a projection extending beyond the wheel. Pressure is applied through the line 70 to the condensate chamber 78 which pressures the line 236 leading to the pressure responsive valve 226 which pilot valve at that time is in position to supply pressure to line 228 from which pressure flows to line 80 into the time cycle control valve 82. Pressure from line 79 is also applied to line 81 which pressure, after passing through a pressure reducing regulator 83, enters the pressure line 85 connected to passageway 148 in pilot valve A and the pressure line 87 connected to passageway 164 in pilot valve B. This supplies pressure to these pilots A and B for operation of the motor valves 50 and 52. Pressure from line 81 also enters line 89 to supply pressure to the pressure responsive pilot valve 196 for operation of the pressure responsive shift actuator 180.

The clock 133 is started causing the time wheel 84 to commence rotation. Upon the first pin 132 on the time wheel 84 contacting the bar 126 pressure is drained from the line 86 causing the actuator 88 to retract the pawl 90. Upon the pin 132 passing beyond the bar 126, pressure is supplied to the line 86 causing the actuator 88 to advance the pawl 90 and rotate the ratchet wheel one position.

The advancement of the rotors 100 and 102 in pilots A and B from ports 1' and 1 to ports 2' and 2 causes pressure to be drained from ports 1 and 2' and pressure to be supplied to ports 1' and 2. This operates the motor valves 50 and 52 connected to these ports 1, 1', 2, and 2' to stop the withdrawal of fluid from one flow conduit through its withdrawl conduit and commence the withdrawal of fluid from another flow conduit. This movement of the rotor 102 in pilot B also causes pen 1 to move to its original position and operates pen 2.

As the time wheel 84 advances, another pin 132 contacts the bar 126 bleeding pressure from line 86 causing the pawl 90 to retract and upon this pin 132 passing beyond the end of the bar 126 pressure is applied to line 86 advancing the pawl 90 and ratchet wheel 92 and hence rotors 100 and 102 to alignment with ports 3' and 3 and the sequence is repeated.

Upon the completion of one revolution of the ratchet wheel 92, and hence of the rotors 100 and 102, the bleed valve 204 is operated by the pin 210 on the skip wheel 206 causing the pressure responsive pilot valve 196 to change positions and actuate the pressure responsive shift actuator to shift the rotors 100 and 102 in pilots A and B from ports 24' and 24 respectively in the rows 146 of ports over to ports 25' and 25 in the rows 144. Upon the completion of another rotation of ratchet wheel 92 and hence of the rotors 100 and 102 the other bleed valve 202 is actuated by pin 208 causing a reversal of the pressure responsive pilot valve 196 and hence of the pressure responsive shift actuator 180. This causes the rotors 100 and 102 to shift into alignment with ports 1' and 1 in rows 146 for a repeat of the sequence.

This shifting of the rotors 100 and 102 causes a shifting of the ratchet wheel 92 but the pawl 90 is sufficiently wide to always be aligned with at least one of the rows 94 or 96 of pins on the ratchet wheel 92.

If at any time during this sequence the projection or bolt representing one of the flow conduits is extended it will contact the bleed valve 234 which will reverse the pressure responsive pilot valve 226 causing pressure to bleed from lines 80 and 240. This bleeding of pressure from the line 80 will bleed pressure from line 86 through the time cycle control valve 82 and cause the pawl 90 to retract to prepare for another stroke. The bleeding of pressure from the line 240 will cause the pressure responsive actuator 252 to retract the movable member 238 away from the skip wheel 206 and actuate the bleed valve 232. Actuation of the bleed valve 232 will reverse the position of the pressure responsive pilot valve 226 and will pressure the lines 80 and 240. Pressure in line 80 will cause line 86 to be pressured through the time cycle control valve 82 and actuate the pressure responsive actuator 88 to advance the ratchet wheel 92 to the next position. The pressure in line 240 will cause the pressure responsive actuator 242 to move the movable member 238 toward the skip wheel 206 to be ready for another cycle of operation to be commenced by the next bolt extending from the wheel 206 contacting the bleed valve 234.

Obviously, if the number of withdrawal conduits that are to be opened in less than the number of ports in row 144 or 146 of pilots A and B then the motor valves 50 and 52 in those withdrawal conduits and the flow conduits communicating with them could be connected to the ports in either row 144 or 146 and the shifting mechanism disconnected such as by removing the pins 208 and 210 on the skip wheel 206.

If motor valves 50a and 52a are used and operated by pilot B as illustrated in FIGURE 12, pilot A could be omitted.

While it is not part of the present invention, if desired, the number of times the rotors 100 and 102 shift may be recorded on a counter 314 operated by a pressure responsive actuator 316 in communication with the line 194 to the pressure responsive shift actuator 180. Similarly, each time the ratchet wheel 92 is advanced one position, or the position of the rotors 100 and 102 may be indicated by an indicator 318 operated by pressure responsive actuator 320 connected to line 80.

While the present invention has been described in connection with its use for the flow of oil well fluid it will be understood that the invention may be used in many other situations. In addition, rearrangements and substitution of parts will readily suggest themselves to those skilled in the art and such are encompassed within the spirit of the invention and the scope of the appended claims.

The invention is well suited to carry out the objects and attain the advantages and ends mentioned as well as others inherent therein. Accordingly, the invention is to be limited only by the spirit thereof and the scope of the appended claims.

What is claimed is:

1. In a fluid flow control system for temporarily diverting fluid flow from a plurality of conduits sequentially, the improvement comprising:
   (a) a plurality of flow conduits for transporting fluid,
   (b) a plurality of withdrawal conduits, each such withdrawal conduit being in fluid communication with a flow conduit,
   (c) fluid operated motor valve means controlling fluid flow in the conduits,
   (d) control means for sequentially diverting fluid flow from each flow conduit to the withdrawal conduit connected to it while maintaining fluid flow in the other flow conduits, said control means including:
      (1) a first pilot valve including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of ports, said movable valve element having a projection contacting the casing at the ports said projection being of lesser cross-sectional dimension than the distance between the ports whereby when the projection is over one of the ports the other ports are uncovered, a fluid passageway through the movable valve element communicating between the exterior of the pilot valve and the projection and forming an orifice in the projection, and a source of fluid pressure in communication with the fluid passageway through the movable valve element, (2) a pressure responsive first actuator associated with the first pilot valve for moving the movable valve element to successive positions of the orifice covering one port in a row to covering another port in that row, (3) fluid pressure lines between ports and the motor valve means for operating said motor valve means to divert fluid flow from one flow conduit to the withdrawal conduit connected with it while maintaining fluid flow in the other flow conduits each time the movable valve element moves from a position in which the orifice covers one port into a position covering another port, (4) shift means connected to the movable valve element for moving the orifice from one row of ports to another row of ports upon the completion of a predetermined amount of movement of the movable valve element, (e) indicating means operated by fluid pressure from the port covered by the orifice for indicating which port is covered by the projection, (f) a skip assembly including:

(1) a rotatable disc associated with the movable valve element and rotated by movement of the movable valve element to successive positions corresponding to the successive positions of the movable valve element and adapted to carry bleed valve actuators on its surface at positions corresponding to the aforesaid positions of the movable valve element, (2) a movable member adjacent the disc mounted for reciprocating movement toward and away from the disc, (3) a pressure responsive second actuator adapted to reciprocate the movable member, (4) a pressure responsive second pilot valve adapted in a first position to drain fluid pressure from a fluid pressure line and in a second position to supply pressure to the last mentioned fluid pressure line, the last mentioned fluid pressure line operatively connected to the first and second pressure responsive actuators whereby upon the second pilot valve being moved to its first position the movable member is moved away from the disc, and upon the second pilot valve being moved to its second position the movable valve element in the first pilot valve is moved into its next position and the movable member is moved toward the disc, and (5) bleed valve means carried by the movable member and connected to the second pilot valve for moving the second pilot valve from the first to the second position and then from the second to the first position upon operation of the bleed valve means by a bleed valve actuator.

2. In a fluid control system for temporarily diverting fluid flow from a plurality of conduits separately, the improvement comprising:

(a) a plurality of flow conduits for transporting fluid, (b) a plurality of withdrawal conduits, each such withdrawal conduit being in fluid communication with a flow conduit, (c) valve means controlling the fluid flow in the conduits, (d) control means for diverting fluid flow from each flow conduit to the withdrawal conduit connected to it while maintaining fluid flow in the other flow conduits, (e) a fluid pressure source for each withdrawal conduit which has fluid flow through it, and (f) a system for indicating each of X number of fluid pressure sources by the use of $n$ number of pressure responsive indicators in which system $n$ is a number less than X and including a plurality of shuttle valves, each shuttle valve having two separate inlets and one outlet, said system including:

(1) a first group of pressure responsive indicators numbered 1 through $n'$, each indicator in said first group alone indicating one of the pressure sources 1 through $n'$, $n'$ being a number less than $n$, (2) a second group of pressure responsive indicators numbered $n'+1$ through $n$, at least one pressure responsive indicator from the second group alone indicating one of the sources $n'+1$ through X and a combination of one pressure responsive indicator from each of the first and second groups indicating other numbers of sources $n'+1$ through X, (3) for each indicator 1 through $n'$, a separate bank of shuttle valves connecting such indicator to all of the sources of pressure which actuate that indicator, said bank having one less shuttle valve than the number of pressure sources which actuate that indicator, each shuttle valve in the bank having each outlet connected to an inlet of another shuttle valve in the same bank except one shuttle valve, a connection between the outlet of that one shuttle valve and the last mentioned indicator, and a connection between each pressure source operating the last mentioned indicator and a separate inlet to one of the shuttle valves in the bank other than an inlet connected to the outlet of another shuttle valve, and (4) for each indicator $n'+1$ through $n$, a separate bank of shuttle valves connecting such indicator to all the sources of pressure which actuate that indicator, said bank having one less shuttle valve than the number of sources which actuate said last mentioned indicator, each shuttle valve in each bank having each outlet connected to an inlet of another shuttle valve in the same bank except one shuttle valve, a connection between the outlet of that one shuttle valve and the last mentioned indicator, and a connection between each pressure source operating the last mentioned indicator and each one of the inlets of each shuttle valve other than the inlet connected to the outlet of a shuttle valve.

3. The combination of claim 2 in which $n'$ is 9.

4. In a fluid control system for temporarily diverting fluid flow from a plurality of conduits sequentially, the improvement comprising:

(a) a plurality of flow conduits for transporting fluid, (b) a plurality of withdrawal conduits, each such withdrawal conduit being in fluid communication with a flow conduit, (c) fluid operated motor valve means controlling fluid flow in the conduits, (d) control means for sequentially diverting fluid flow from each flow conduit to the withdrawal conduit connected to it while maintaining fluid flow in the other flow conduits, said control means including:
  (1) a pilot valve including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of ports said movable valve element having a projection contacting the casing at the ports said projection being of lesser cross-sectional dimension than the distance between the ports whereby when the projection is over one of the ports the other ports are uncovered, a fluid passageway through the movable valve element communicating between the exterior of the pilot valve and the projection and forming an orifice in the projection, and a source of fluid pressure in communication with the fluid passageway through the movable valve element,
  (2) an actuator associated with the pilot valve for moving the movable valve element to successive positions of the orifice covering one port in a row to covering another port in that row,
  (3) fluid pressure lines between the ports and the motor valve means for operating said motor valve means to divert fluid flow from one flow conduit to the withdrawal conduit connected with it while maintaining fluid flow in the other flow conduits each time the movable valve element moves from a position in which the orifice covers one port to a position covering an adjacent port, and
  (4) shift means connected to the movable valve element for moving the orifice from one row of ports to another row of ports upon the completion of a predetermined amount of movement of the movable valve element.

5. The combination of claim 4 in which the valve chamber of the pilot valve is cylindrical and has a cylindrical wall, the spaced rows of spaced and aligned ports are in the cllindrical wall, and the movable valve element is a rotor with its axis of rotation coinciding with the axis of the valve chamber.

6. The combination of claim 4 in which the shift means includes:
  (a) a pressure responsive pilot valve adapted in a first position to drain fluid pressure from a pressure line and in a second position to supply fluid pressure to said last mentioned pressure line,
  (b) a pressure responsive actuator connected to the movable valve element and the last mentioned pressure line whereby upon the pressure responsive pilot valve being in a first position the orifice is moved from one row of ports to another row of ports and upon the pressure responsive pilot valve being in a second position the orifice is moved to the former row of ports,
  (c) first and second bleed valves connected to the pressure responsive pilot valve for moving the pressure responsive pilot valve between the first and second positions upon operation of the first and second bleed valves respectively, and
  (d) first and second bleed valve contacts associated with the movable valve element, said first bleed valve contact operating the first bleed valve upon completion of a predetermined movement of the movable valve element along one row of ports and the second bleed valve contact operating the second bleed valve upon predetermined movement of the movable valve element along another row of ports.

7. In a fluid control system for temporarily diverting fluid flow from a plurality of conduits sequentially, the improvement comprising:
  (a) a plurality of flow conduits for transporting fluid,
  (b) a plurality of withdrawal conduits, each such withdrawal conduit being in fluid communication with a flow conduit,
  (c) fluid operated motor valve means controlling fluid flow in the conduits,
  (d) control means for sequentially diverting fluid flow from each flow conduit to the withdrawal conduit connected to it while maintaining fluid flow in the other flow conduits, said control means including:
    (1) a first pilot valve including a casing containing a cylindrical valve chamber having a cylindrical lateral wall, a plurality of spaced rows of spaced and aligned ports through the cylindrical wall of the casing, a fluid passageway through the casing communicating with the cylindrical valve chamber, a rotor in said valve chamber with its axis of rotation coinciding with the axis of the valve chamber said rotor including a projection extending radially from said rotor and contacting the cylindrical wall of the casing at the ports, said projection having a lesser cross-sectional dimension than the distance between the ports whereby when said projection is over one of the ports the other ports are uncovered, a fluid passageway through the rotor communicating between the exterior of the first pilot valve and the projection and forming an orifice in the projection, and a source of fluid pressure in communication with the fluid passageway through the rotor,
    (2) an actuator associated with the first pilot valve for moving the rotor to successive positions of the orifice covering one port in a row to covering another port in that row,
    (3) fluid pressure lines between the ports and the motor valve means for operating said motor valve means to divert fluid flow from one flow conduit to the withdrawal conduit connected with it while maintaining fluid flow in the other flow conduits each time the rotor moves from a position in which the orifice covers one port to a position covering another port, and
    (4) shift means including:
      (i) a pressure responsive second pilot valve adapted in a first position to drain pressure from a pressure line and in a second position to supply pressure to said last mentioned pressure line,
      (ii) a pressure responsive actuator connected to the rotor and the last mentioned pressure line whereby upon the second pilot valve being in a first position the orifice is moved from one row of ports to another row of ports and upon the second pilot valve being in a second position the orifice is moved to the former row of ports,
      (iii) first and second bleed valves connected to the second pilot valve for moving the second pilot valve between the first and second positions upon operation of the first and second bleed valves respectively, and
      (iv) first and second bleed valve contacts associated with the rotor, said first bleed valve contact operating the first bleed valve upon completion of one rotation of the rotor and the second bleed valve contact operating the second bleed valve upon another complete rotation of the rotor.

8. In a fluid control system for temporarily diverting fluid flow from a plurality of conduits sequentially, the improvement comprising:
   (a) a plurality of flow conduits for transporting fluid,
   (b) a plurality of withdrawal conduits, each such withdrawal conduit being in fluid communication with a flow conduit,
   (c) fluid operated valve means controlling fluid flow in the conduits,
   (d) control means for sequentially diverting fluid flow from each flow conduit to the withdrawal conduit connected to it while maintaining fluid flow in the other conduits, said control means including:
      (1) first and second pilot valves each including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of the ports said movable valve element having a projection contacting the casing and the ports, said projection being of lesser cross-sectional dimension than the distance between the ports whereby when the projection is over one of the ports the other ports are uncovered, a fluid passageway through the movable valve element communicating between the exterior of the pilot valve and the projection and forming an orifice in the projection,
      (2) a source of fluid pressure in communication with the fluid passageway through the casing of the first pilot valve and the fluid passageway through the movable valve element of the second pilot valve,
      (3) an actuator associated with the pilot valves for moving the movable valve elements simultaneously to successive positions of the orifice in each one covering one port in a row to covering another port in that row,
      (4) fluid pressure lines communicating between the ports of both pilot valves and the motor valve means for operating the motor valve means to divert fluid flow from one flow conduit to the withdrawal conduit connected with it while maintaining fluid flow in the other conduits each time the movable valve elements move from a position in which the orifice in each one covers one port to a position covering another port, and
      (5) shift means connected to the movable valve elements for moving each orifice from one row of ports to another row of ports upon completion of a predetermined amount of movement of the movable valve elements.

9. The combination of claim 8 in which the shift means includes:
   (a) a pressure responsive third pilot valve adapted in a first position to drain fluid pressure from a pressure line and in a second position to supply fluid pressure to said last mentioned pressure line,
   (b) a pressure responsive actuator connected to the movable valve element and the last mentioned pressure line whereby upon the third pilot being in a first position each orifice is moved from one row of ports to another row of ports and upon the third pilot valve being in a second position each orifice is moved to the former row of ports,
   (c) first and second bleed valves connected to the third pilot valve for moving the third pilot valve between the first and second positions upon operation of the first and second bleed valves respectively, and
   (d) first and second bleed valve contacts associated with the movable valve element, said first bleed valve contact operating the first bleed valve upon completion of a predetermined movement of each of the movable valve elements along one row of ports and the second bleed valve contact operating the second bleed valve upon predetermined movement of each of the movable valve elements along another row of ports.

10. In a fluid control system for temporarily diverting fluid flow from a plurality of conduits sequentially, the improvement comprising:
   (a) a plurality of flow conduits for transporting fluid,
   (b) a plurality of withdrawal conduits, each such withdrawal conduit being in fluid communication with a flow conduit,
   (c) fluid operated valve means controlling fluid flow in the conduits,
   (d) control means for sequentially diverting fluid flow from each flow conduit to the withdrawal conduit connected to it while maintaining fluid flow in the other flow conduits, said control means including:
      (1) first and second pilot valves each including a casing containing a cylindrical valve chamber having a cylindrical wall, a plurality of spaced rows of spaced and aligned ports through the cylindrical wall of the casing, a fluid passageway through the casing communicating with the cylindrical valve chamber, a rotor in said valve chamber with its axis of rotation coinciding with the axis of the valve chamber, said rotor including a projection extending radially from said rotor and contacting the cylindrical wall of the casing at the ports, said projection having a lesser cross-sectional dimension than the distance between the ports whereby when said projection is over one of the ports the other ports are uncovered, a fluid passageway through the rotor communicating between the exterior of the pilot valve and the projection and forming an orifice in the projection,
      (2) a source of fluid pressure in communication with the fluid passageway through the casing of the first pilot valve and the fluid passageway through the rotor of the second pilot valve,
      (3) an actuator associated with the pilot valves for moving the rotors simultaneously to successive positions of each orifice covering one port in a row to covering another port in that row,
      (4) fluid pressure lines communicating between the ports of both pilot valves and the motor valve means for operating the motor valve means to divert fluid flow from one flow conduit to the withdrawal conduit connected with it while maintaining fluid flow in the other conduits each time the rotors move from a position in which the orifice in each one covers one port to a position covering another port, and
      (5) shift means connected to the rotors for moving each orifice from one row of ports to another row of ports upon completion of a predetermined movement of the rotors.

11. In a fluid flow control system for temporarily diverting fluid flow from a plurality of conduits sequentially, the improvement comprising:
   (a) a plurality of flow conduits for transporting fluid,
   (b) a plurality of withdrawal conduits, each such withdrawal conduit being in fluid communication with a flow conduit,
   (c) fluid operated motor valve means controlling fluid flow in the conduits,
   (d) control means for sequentially diverting fluid flow from each flow conduit to the withdrawal conduit connected to it while maintaining fluid flow in the other flow conduits, said control means including:
- (1) a first pilot valve including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of ports said movable valve element having a projection contacting the casing at the ports said projection being of lesser cross-sectional dimension than the distance between the ports whereby when the projection is over one of the ports the other ports are uncovered, a fluid passageway through the movable valve element communicating between the exterior of the pilot valve and the projection and forming an orifice in the projection, and a source of fluid pressure in communication with the fluid passageway through the movable valve element,
- (2) a pressure responsive first actuator associated with the first pilot valve for moving the movable valve element to successive positions of the orifice covering one port in a row to covering another port in that row,
- (3) fluid pressure lines between ports and the motor valve means for operating said motor valve means to divert fluid flow from one flow conduit to the withdrawal conduit connected with it while maintaining fluid flow in the other flow conduits each time the movable valve element moves from a position in which the orifice covers one port into a position covering another port, (e) indicating means operated by fluid pressure from the port covered by the orifice for indicating which port is covered by the projection, (f) a skip assembly including:
- (1) a rotatable disc associated with the movable valve element and rotated by movement of the movable valve element to successive positions corresponding to the successive positions of the movable valve element and adapted to carry bleed valve actuators on its surface at positions corresponding to the aforesaid positions of the movable valve element,
- (2) a movable member adjacent the disc mounted for reciprocating movement toward and away from the disc,
- (3) a pressure responsive second actuator adapted to reciprocate the movable member,
- (4) a pressure responsive second pilot valve adapted in a first position to drain fluid pressure from a fluid pressure line and in a second position to supply pressure to the last mentioned fluid pressure line the last mentioned fluid pressure line being operatively connected to the first and second pressure responsive actuators whereby upon the second pilot valve being moved to its first position the movable member is moved away from the disc and upon the second pilot valve being moved to its second position the movable valve element in the first pilot valve is moved into its next position and the movable member is moved toward the disc, and
- (5) bleed valve means carried by the movable member and connected to the second pilot valve for moving the second pilot valve from the first to the second position and then from the second to the first position upon operation of the bleed valve means by a bleed valve actuator.

12. In a fluid flow control system for operating a plurality of pressure responsive devices, the improvement comprising:

(a) control means for applying fluid pressure to the pressure responsive devices, said control means including:
- (1) a first pilot valve including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of ports said movable valve element having a projection contacting the casing at the ports said projection being of lesser cross-sectional dimension than the distance between the ports whereby when the projection is over one of the ports the other ports are uncovered, a fluid passageway through the movable valve element communicating between the exterior of the pilot valve and the projection and forming and orifice in the projection, and a source of fluid pressure in communication with the fluid passageway through the movable valve element,
- (2) a pressure responsive first actuator associated with the first pilot valve for moving the movable valve element to successive positions of the orifice covering one port in a row to covering another port in that row,
- (3) fluid pressure lines between ports and the pressure responsive devices for operating a pressure responsive device each time the movable valve element moves from a position in which the orifice covers one port into a position covering another port,
- (4) shift means connected to the movable valve element for moving the orifice from one row of ports to another row of ports upon the completion of a predetermined amount of movement of the movable valve element, (b) indicating means operated by fluid pressure from the port covered by the orifice for indicating which port is covered by the projection, (c) a skip assembly including:
- (1) a rotatable disc associated with the movable valve element and rotated by movement of the movable valve element to successive positions corresponding to the successive positions of the movable valve element and adapted to carry bleed valve actuators on its surface at positions corresponding to the aforesaid positions of the movable valve element,
- (2) a movable member adjacent the disc mounted for reciprocating movement toward and away from the disc,
- (3) a pressure responsive second actuator adapted to reciprocate the movable member,
- (4) a pressure responsive second pilot valve adapted in a first position to drain fluid pressure from a fluid pressure line and in a second position to supply pressure to the last mentioned fluid pressure line, the last mentioned fluid pressure line operatively connected to the first and second pressure responsive actuators whereby upon the second pilot valve being moved to its first position the movable member is moved away from the disc, and upon the second pilot valve being moved to its second position the movable valve element in the first pilot valve is moved into its next position and the movable member is moved toward the disc, and
- (5) bleed valve means carried by the movable member and connected to the second pilot valve for moving the second pilot valve from the first to the second position and then from the second to the first position upon operation of the bleed valve means by a bleed valve actuator.

13. The combination comprising:
(a) a plurality of operative devices,
(b) control means for operating at least one of said devices at a time,
(c) a fluid pressure source from each operative device while it is being operated, and
(d) a system for indicating each of X number of fluid pressure sources by the use of $n$ number of pressure responsive indicators in which system $n$ is a number less than X and including a plurality of shuttle valves, each shuttle valve having two separate inlets and one outlet, said system including:
 (1) a first group of pressure responsive indicators numbered 1 through $n'$, each indicator in said first group alone indicating one of the pressure sources 1 through $n'$, $n'$ being a number less than $n$,
 (2) a second group of pressure responsive indicators numbered $n'+1$ through $n$, at least one pressure responsive indicator from the second group alone indicating one of the sources $n'+1$ through X and a combination of one pressure responsive indicator from each of the first and second groups indicating other numbers of sources $n'+1$ through X,
 (3) for each indicator 1 through $n'$, a separate bank of shuttle valves connecting such indicator to all of the sources of pressure which actuate that indicator, said bank having one less shuttle valve than the number of pressure sources which actuate that indicator, each shuttle valve in the bank having each outlet connected to an inlet of another shuttle valve in the same bank except one shuttle valve, a connection between the outlet of that one shuttle valve and the last mentioned indicator, and a connection between each pressure source operating the last mentioned indicator and a separate inlet to one of the shuttle valves in the bank other than an inlet connected to the outlet of another shuttle valve, and
 (4) for each indicator $n'+1$ through $n$, a separate bank of shuttle valves connecting such indicator to all the sources of pressure which actuate that indicator, said bank having one less shuttle valve than the number of sources which actuate said last mentioned indicator, each shuttle valve in each bank having each outlet connected to an inlet of another shuttle valve in the same bank except one shuttle valve, a connection between the outlet of that one shuttle valve and the last mentioned indicator, and a connection between each pressure source operating the last mentioned indicator and each one of the inlets of each shuttle valve other than the inlet connected to the outlet of a shuttle valve.

14. The combination of claim 13 in which $n'$ is 9.

15. In a fluid control system for operating a plurality of pressure responsive devices, the improvement comprising control means for applying pressure to the pressure responsive devices, said control means including:
(a) a pilot valve including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of ports, said movable valve element having a projection contacting the casing at the ports said projection being of lesser cross-sectional dimension than the distance between the ports whereby when the projection is over one of the ports the other ports are uncovered, a fluid passageway through the movable valve element communicating between the exterior of the pilot valve and the projection and forming an orifice in the projection, and a source of fluid pressure in communication with the fluid passageway through the movable valve element,
(b) an actuator associated with the pilot valve for moving the movable valve element to successive positions of the orifice covering one port in a row to covering another port in that row,
(c) fluid pressure lines between the ports and the pressure responsive devices for operating a pressure responsive device each time the movable valve element moves from a position in which the orifice covers one port to a position covering an adjacent port, and
(d) shift means connected to the movable valve element for moving the orifice from one row of ports to another row of ports upon the completion of a predetermined amount of movement of the movable valve element.

16. The combination of claim 15 in which the shift means includes:
(a) a pressure responsive pilot valve adapted in a first position to drain fluid pressure from a pressure line and in a second position to supply fluid pressure to said last mentioned pressure line,
(b) a pressure responsive actuator connected to the movable valve element and the last mentioned pressure line whereby upon the pressure responsive pilot valve being in a first position the orifice is moved from one row of ports to another row of ports and upon the pressure responsive pilot valve being in a second position the orifice is moved to the former row of ports,
(c) first and second bleed valves connected to the pressure responsive pilot valve for moving the pressure responsive pilot valve between the first and second positions upon operation of the first and second bleed valves respectively, and
(d) first and second bleed valve contacts associated with the movable valve element, said first bleed valve contact operating the first bleed valve upon completion of a predetermined movement of the movable valve element along one row of ports and the second bleed valve contact operating the second bleed valve upon predetermined movement of the movable valve element along another row of ports.

17. The combination of claim 15 in which the valve chamber of the pilot valve is cylindrical and has a cylindrical wall, the spaced rows of spaced and aligned ports are in the cylindrical wall, and the movable valve element is a rotor with its axis of rotation coinciding with the axis of the valve chamber.

18. In a fluid control system for operating a plurality of pressure responsive devices, the improvement comprising control means for applying fluid pressure to the pressure responsive devices, said control means including:
(a) a first pilot valve including a casing containing a cylindrical valve chamber having a cylindrical lateral wall, a plurality of spaced rows of spaced and aligned ports through the cylindrical wall of the casing, a fluid passageway through the casing communicating with the cylindrical valve chamber, a rotor in said valve chamber with its axis of rotation coinciding with the axis of the valve chamber said rotor including a projection extending radially from said rotor and contacting the cylindrical wall of the casing at the ports, said projection having a lesser cross-sectional dimension than the distance between the ports whereby when said projection is over one of the ports the other ports are uncovered, a fluid passageway through the rotor communicating between the exterior of the first pilot valve and the projection and forming an orifice in the projection, and a source of fluid pressure in communication with the fluid passageway through the rotor, (b) an actuator associated with the first pilot valve for moving the rotor to successive positions of the orifice covering one port in a row to covering another port in that row, (c) fluid pressure lines between the ports and the pressure responsive devices for operating a pressure responsive device each time the rotor moves from a position in which the orifice covers one port to a position covering another port, and (d) shift means including:

(1) a pressure responsive second pilot valve adapted in a first position to drain pressure from a pressure line and in a second position to supply pressure to said last mentioned pressure line, (2) a pressure responsive actuator connected to the rotor and the last mentioned pressure line whereby upon the second pilot valve being in a first position the orifice is moved from one row of ports to another row of ports and upon the second pilot valve being in a second position the orifice is moved to the former row of ports, (3) first and second bleed valves connected to the second pilot valve for moving the second pilot valve between the first and second positions upon operation of the first and second bleed valves respectively, and (4) first and second bleed valve contacts associated with the rotor, said first bleed valve contact operating the first bleed valve upon completion of one rotation of the rotor and the second bleed valve contact operating the second bleed valve upon another complete rotation of the rotor.

19. In a fluid control system for operating a plurality of pressure responsive devices, the improvement comprising control means for applying fluid pressure to the pressure responsive devices, said control means including:

(a) first and second pilot valves each including a casing containing a valve chamber, a plurality of spaced rows of spaced and aligned ports through the casing and into the valve chamber, a fluid passageway through the casing communcating with the valve chamber, a movable valve element in the valve chamber movable along each of the rows of the ports of said movable valve element having a projection contacting the casing and the ports, said projection being of lesser cross-sectional dimension than the distance between the ports whereby when the projection is over one of the ports the other ports are uncovered, a fluid passageway through the movable valve element communicating between the exterior of the pilot valve and the projection and forming an orifice in the projection, (b) a source of fluid pressure in communication with the fluid passageway through the casing of the first pilot valve and the fluid passageway through the movable valve element of the second pilot valve, (c) an actuator associated with the pilot valves for moving the movable valve elements simultaneously to successive positions of the orifice in each one covering one port in a row to covering another port in that row, (d) fluid pressure lines communicating between the ports of both pilot valves and the pressure reponsive devices for operating a pressure responsive device each time the movable valve elements move from a position in which the orifice in each one covers one port to a position covering another port, and (e) shift means connected to the movable valve elements for moving each orifice from one row of ports to another row of ports upon completion of a predetermined amount of movement of the movable valve elements.

20. The combination of claim 19 in which the shift means includes:

(a) a pressure responsive third pilot valve adapted in a first position to drain fluid pressure from a pressure line and in a second position to supply fluid pressure to said last mentioned pressure line, (b) a pressure responsive actuator connected to the movable valve element and the last mentioned pressure line whereby upon the third pilot being in a first position each orifice is moved from one row of ports to another row of ports and upon the third pilot valve being in a second position each orifice is moved to the former row of ports, (c) first and second bleed valves connected to the third pilot valve for moving the third pilot valve between the first and second positions upon operation of the first and second bleed valves respectively, and (d) first and second bleed valve contacts associated with the movable valve element, said first bleed valve contact operating the first bleed valve upon completion of a predetermined movement of each of the movable valve elements along one row of ports and the second bleed valve contact operating the second bleed valve upon predetermined movement of each of the movable valve elements along another row of ports.

21. In a fluid control system for operating a plurality of pressure responsive devices, the improvement comprising control means for applying fluid pressure to the pressure responsive devices, said control means including:

(a) first and second pilot valves each including a casing containing a cylindrical valve chamber having a cylindrical wall, a plurality of spaced rows of spaced and aligned ports through the cylindrical wall of the casing, a fluid passageway through the casing communicating with the cylindrical valve chamber, a rotor in said valve chamber with its axis of rotation coinciding with the axis of the valve chamber, said rotor including a projection extending radially from said rotor and contacting the cylindrical wall of the casing at the ports, said projection having a lesser cross-sectional dimension than the distance between the ports whereby when said projection is over one of the ports the other ports are uncovered, a fluid passageway through the rotor communicating between the exterior of the pilot valve and the projection and forming an orifice in the projection.

(b) a source of fluid pressure in communication with the fluid passageway through the casing of the first pilot valve and the fluid passageway through the rotor of the second pilot valve, (c) an actuator associated with the pilot valves for moving the rotors simultaneously to successive positions of each orifice covering one port in a row to covering another port in that row, (d) fluid pressure lines communicating between the ports of both pilot valves and the pressure responsive devices for operating a pressure responsive device each time the rotors move from a position in which the orifice in each one covers one port to a position covering another port, and (e) shift means connected to the rotors for moving each orifice from one row of ports to another row of ports upon completion of a predetermined movement of the rotors.

22. The combination of claim 21 in which the shaft means includes:

(a) a pressure responsive third pilot valve adapted in a first position to drain fluid pressure from a pressure line and in a second position to supply pressure to said last mentioned pressure line, (b) a pressure responsive actuator connected to the rotors and the last mentioned pressure line whereby upon the third pilot valve being in a first position each orifice is moved from one row of ports to another row of ports and upon the third pilot valve being in a second position each orifice is moved to the former row of ports, (c) first and second bleed valve contacts connected to the third pilot valve for moving the third pilot valve between the first and second positions upon operation of the first and second bleed valves respectively, and (d) first and second bleed valve contacts associated with the rotors, said first bleed valve contact operating the first bleed valve upon completion of a predetermined movement of each rotor along one row of ports and the second bleed valve contact operating the second bleed valve upon predetermined movement of the rotor along another row of ports.

23. In a fluid flow control system for operating a plurality of pressure responsive devices, the improvement comprising:

(a) control means for applying fluid pressure to the pressure responsive devices, said control means including:

(1) a first pilot valve including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of ports said movable valve element having a projection contacting the casing at the ports said projection being of lesser cross-sectional dimension than the distance between the ports whereby when the projection is over one of the ports the other ports are uncovered, a fluid passageway through the movable valve element communicating between the exterior of the pilot valve and the projection and forming an orifice in the projection, and a source of fluid pressure in communication with the fluid passageway through the movable valve element, (2) a pressure responsive first actuator associated with the first pilot valve for moving the movable valve element to successive positions of the orifice covering one port in a row to covering another port in that row, (3) fluid pressure lines between ports and the pressure responsive devices for operating a pressure responsive device each time the movable valve element moves from a position in which the orifice covers one port into a position covering another port, (b) indicating means operated by fluid pressure from the port covered by the orifice for indicating which port is covered by the projection, (c) a skip assembly including:

(1) a rotatable disc associated with the movable valve element and rotated by movement of the movable valve element to successive positions corresponding to the successive positions of the movable valve element and adapted to carry bleed valve actuators on its surface at positions corresponding to the aforesaid positions of the movable valve element, (2) a movable member adjacent the disc mounted for reciprocating movement toward and away from the disc, (3) a pressure responsive second actuator adapted to reciprocate the movable member, (4) a pressure responsive second pilot valve adapted in a first position to drain fluid pressure from a fluid pressure line and in a second position to supply pressure to the last mentioned fluid pressure line the last mentioned fluid pressure line being operatively connected to the first and second pressure responsive actuators whereby upon the second pilot valve being moved to its first position the movable member is moved away from the disc and upon the second pilot valve being moved to its second position the movable valve element in the first pilot valve is moved into its next position and the movable member is moved toward the disc, and (5) bleed valve means carried by the movable member and connected to the second pilot valve for moving the second pilot valve from the first to the second position and then from the second to the first position upon operation of the bleed valve means by a bleed valve actuator.

24. In a fluid control system the improvement comprising control means for applying fluid pressure to a plurality of points, said control means including:

(a) a pilot valve including a casing containing a valve chamber, a plurality of spaced rows of spaced and aligned ports through the casing and into the valve chamber, a fluid passageway through the casing communicating with the valve chamber, a movable valve element in the valve chamber movable along each of the rows of ports said movable valve element having a projection contacting the casing at the ports, said projection being of lesser cross-sectional dimension than the distance between the ports whereby when the projection is over one of the ports the other ports are uncovered, and a fluid passageway through the movable valve element communicating between the exterior of the pilot valve and the projection and forming an orifice in the projection, (b) an actuator associated with the pilot valve for moving the movable valve element to successive positions of the orifice covering one port in a row to covering another port in that row, and (c) shift means connected to the movable valve element for moving the orifice from one row of ports to another row of ports upon the completion of a predetermined amount of movement of the movable valve element.

25. The combination of claim 24 in which the valve element of the pilot valve is cylindrical and has a cylindrical wall, the spaced rows of spaced and aligned ports are in the cylindrical wall, and the movable valve element is a rotor with its axis of rotation coinciding with the axis of the valve chamber.

References Cited by the Examiner

UNITED STATES PATENTS

| 2,888,098 | 5/1959 | Florence | 137—625.11 X |
| 3,005,467 | 10/1961 | Suchoza et al. | 137—625.11 |

References Cited by the Applicant

UNITED STATES PATENTS

| 2,125,513 | 8/1938 | Martin. |
| 2,204,532 | 6/1940 | Erbguth et al. |
| 2,478,702 | 8/1949 | Moody. |
| 2,736,201 | 2/1956 | Ohlson et al. |
| 2,845,125 | 7/1958 | Truman. |
| 2,875,428 | 2/1959 | Griswold. |
| 2,940,477 | 6/1960 | Brown et al. |
| 2,986,167 | 5/1961 | Griswold et al. |
| 3,036,229 | 5/1962 | Kemp et al. |
| 3,045,750 | 7/1962 | Peters et al. |

M. CARY NELSON, *Primary Examiner.*

HENRY T. KLINKSIEK, *Examiner.*